(12) United States Patent
Fullerton et al.

(10) Patent No.: US 6,763,057 B1
(45) Date of Patent: Jul. 13, 2004

(54) VECTOR MODULATION SYSTEM AND METHOD FOR WIDEBAND IMPULSE RADIO COMMUNICATIONS

(75) Inventors: Larry W. Fullerton, Brownsboro, AL (US); James L. Richards, Fayetteville, TN (US); Ivan A. Cowie, Madison, AL (US); Vernon R. Brethour, Owens Cross Roads, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/538,519

(22) Filed: Mar. 29, 2000

Related U.S. Application Data
(60) Provisional application No. 60/169,765, filed on Dec. 9, 1999.

(51) Int. Cl.[7] .................................................. H04B 1/69
(52) U.S. Cl. ....................... 375/141; 375/135; 375/136; 375/142; 375/150; 370/322; 370/342
(58) Field of Search ................................. 375/141, 130, 375/135, 136, 142, 150, 259, 295; 370/320, 342, 441, 515; 340/573.1, 573.3

(56) References Cited

U.S. PATENT DOCUMENTS

| | | | | |
|---|---|---|---|---|
| 5,677,927 A | | 10/1997 | Fullerton | 375/130 |
| 5,812,081 A | | 9/1998 | Fullerton | 342/21 |
| 5,832,035 A | | 11/1998 | Fullerton | 375/149 |
| 6,026,125 A | * | 2/2000 | Larrick, Jr. et al. | 375/295 |
| 6,121,920 A | | 9/2000 | Barett | 342/188 |
| 6,497,656 B1 | * | 12/2002 | Evans et al. | 600/300 |
| 6,504,483 B1 | * | 1/2003 | Richards et al. | 340/573.3 |

OTHER PUBLICATIONS

Spread Spectrum Communications Handbook, Revised Edition, Part 4, Chapter 1, Pseudonoise Code Acquisition in Direct–Sequence Receivers, pp. 751–900, Chapter 2, Pseudocode Tracking in Direct–Sequence Receivers, pp. 901–955, Marvin K. Simon, et al., McGraw–Hill, Inc., 1994.

(List continued on next page.)

*Primary Examiner*—Shuwang Liu
(74) *Attorney, Agent, or Firm*—Waddey & Patterson; Larry W. Brantley

(57) ABSTRACT

An apparatus and method for communicating information using an ultra wideband impulse radio transmitter and receiver is disclosed. The method includes the steps of generating and transmitting a series of time-modulated pulses, each pulse delayed by one of four predetermined time delay periods and representative of at least two data bits of information, and receiving and demodulating the series of time-modulated pulses to estimate the data bits associated with each pulse. The apparatus includes an impulse radio transmitter and an impulse radio receiver. The transmitter transmits the series of time-modulated pulses and includes a transmitter time base, a time delay modulator, a code time modulator, an output stage, and a transmitting antenna. The receiver receives and demodulates the series of time-modulated pulses using a receiver time base and two correlators, one correlator designed to operate after a predetermined delay with respect to the other correlator. Each correlator includes an integrator and a comparator, and may also include an averaging circuit that calculates an average output for each correlator, as well as a track and hold circuit for holding the output of the integrators. The receiver further includes an adjustable time delay circuit that may be used to adjust the predetermined delay between the correlators in order to improve detection of the series of time-modulated pulses.

22 Claims, 21 Drawing Sheets

OTHER PUBLICATIONS

Digital Communications Techniques, Signal Design and Detection, Chapter 3, Scalar and Vector Communications Over the Memoryless Channel, pp. 98–177, Chapter 4, Coherent Communications with Waveforms, pp. 178–292, Marvin K. Simon, et al., Prentice–Hall, Inc., 1995.

Paper entitled "Signal Selection for the Indoor Wireless Impulse Radio Channel," Fernando Ramirez–Mireles, et al., Communication Science Institute, Department of Electrical Engineering–Systems, University of Sourthern California, Los Angeles, CA 90089–2565.

* cited by examiner

VECTOR MODULATION SYSTEM AND METHOD FOR WIDEBAND IMPULSE RADIO COMMUNICATIONS

This application claims benefit of co-pending Provisional U.S. patent application Ser. No. 60/169,765 filed Dec. 9, 1999 and entitled "Vector Modulation System and Method for Wideband Impulse Radio Communications."

BACKGROUND OF THE INVENTION

The present invention relates generally to wideband impulse radio systems. More particularly, this invention pertains to systems and methods for modulating and demodulating wideband impulse radio signals.

There is a continuing need for the development of advanced wireless devices for communications of voice and data, for materials measurement, navigation, environmental sensing, radar, security and numerous other civilian and military applications of radio technology. Improvements are needed in the underlying technology to provide greater reliability, greater accuracy, lower power consumption, lower cost, reduced size, and efficient use of the limited available spectrum. Conventional narrow band AM, FM, CDMA, TDMA and similar wireless communications methods and systems have not fully met these needs.

However, there is an emerging technology called Impulse Radio (including Impulse Radar) ("IR") that offers many potential advantages in addressing these needs. Impulse radio was first fully described in a series of patents including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,303,108 (issued Nov. 8, 1994), all invented by Larry W. Fullerton and assigned to Time Domain Corporation. The disclosure of each of these patents is incorporated in this patent specification by reference.

Impulse radio systems are generally characterized by their transmission of short duration, broad band pulses on a relatively low duty cycle. In some systems these pulses may approach a Gaussian monocycle, where the instantaneous pulse bandwidth is on the order of the center frequency. The short pulse, low duty cycle mechanism produces a processing gain that may be utilized for interference rejection and channelization. Because of the extremely wide instantaneous bandwidth of the pulse, the available processing gain far exceeds what is achieved using typical conventional spread spectrum methods. This enables the utilization of many more channels at higher dynamic ranges and higher data rates than are available in the typical conventional spread spectrum system.

Impulse radio systems have further advantages in the resistance to multipath effect. Because impulse radio signals are divided in time rather than in frequency, time related effects, such as multipath interference, can be separated, resulting in lower average power and higher reliability for a given power level.

Impulse radio techniques are also useful in radar systems. Impulse radar systems enjoy the combined advantages of very short pulses at relatively low frequencies. The short pulses result in high resolution and the low frequency gives relatively high material penetration. If a radar system used a pulse of equivalent bandwidth at a higher carrier frequency, the material penetration properties would usually be impaired. This combined advantage enables IR radio to be used for ground penetrating radar for inspection of bridges, roads, runways, utilities and the like, and security applications, and to "see" through walls for emergency management situations.

Impulse radio systems are not limited to transmitting and receiving Gaussian monocycle pulses. However, some basic impulse radio transmitters attempt to emit short Gaussian monocycle pulses having a tightly controlled average pulse-to-pulse interval. A Gaussian monocycle is the first derivative of the Gaussian function. However, in a real world environment, a perfect Gaussian pulse is not achievable. In the frequency domain, this results in a slight reduction in the signal bandwidth. The signals transmitted by an IR transmitter, including Gaussian monocycles, signals having multiple cycles in a Gaussian envelope, and their real world variations, are sometimes called impulses. The Gaussian monocycle waveform is naturally a wide bandwidth signal, with the center frequency and the bandwidth dependent on the width of the pulse. The bandwidth is approximately 160% of the center frequency. In practice, the center frequency of a monocycle pulse is approximately the reciprocal of its length, and its bandwidth is approximately equal to 1.6 times the center frequency. However, impulse radio systems can be implemented where the transmitted and/or received signals have waveforms other than an ideal Gaussian monocycle.

Most prior art wireless communications systems use some variation of amplitude modulation (AM) or frequency modulation (FM) to communicate voice or data with a radio carrier signal. However, impulse radio systems can communicate information using a novel technique known as pulse position modulation. Pulse position modulation is a form of time modulation in which the value of each instantaneous value or sample of a modulating signal (e.g., a voice or data signal) is caused to change or modulate the position in time of a pulse. In the frequency domain, pulse position modulation distributes the energy over more frequencies.

In some impulse radio communications, the time position (pulse-to-pulse interval) is preferably varied on a pulse-by-pulse basis by two separate components: an information component and a pseudo-random code component. Prior art spread spectrum radio systems make use of pseudo-random codes to spread a narrow band information signal over a relatively wide band of frequencies. A spread spectrum receiver then correlates these signals to retrieve the original information signal. Unlike conventional spread spectrum systems, impulse radio systems achieve spreading through the spectrum of the waveform and thus do not need the pseudo-random code for energy spreading. The pseudo-random code is used to smooth the comb spectrum, reject interference, and for channelization. In some applications, impulse radio transmitters can use pulse widths of between 20 and 0.1 nanoseconds (ns) and pulse-to-pulse intervals of between 2 and 5000 ns. These narrow monocycle pulses have an inherently wide bandwidth. This bandwidth is the range of frequencies in which one or more signal characteristics fall within specified limits, such as for example, six dB below the peak spectral density.

Thus, in some impulse radio systems, the pseudo-random noise (PN) code component is used for different purposes: channelization; energy smoothing in the frequency domain; and interference resistance. Channelization is a procedure employed to divide a communications path into a number of channels. In a system that does not use a coding component, differentiating between separate transmitters would be difficult. PN codes create channels, if there is low correlation and/or interference among the codes being used. If there were a large number of uncoded impulse radio users within a confined area, there might be mutual interference. Further, while the use of the PN coding minimizes that interference, as the number of users rises the probability of an individual pulse from one user's sequence being received simultaneously with a pulse from another user's sequence increases. Fortunately, impulse radio systems can be designed so that they do not depend on receiving every pulse. In such systems, the impulse radio receiver can perform a correlating, synchronous receiving function (at the RF level) that uses a statistical sampling of many pulses to recover the transmitted information. Advanced impulse radio systems may utilize multiple pulses to transmit each data bit of information, and each pulse may be dithered in time to further smooth the spectrum to reduce interference and improve channelization. These systems may also include a sub-carrier for improved interference resistance and implementation advantages. In other embodiments of an impulse radio system, however, each "bit" of transmitted information can be represented by a single pulse, with no coding component.

Energy smoothing in the frequency domain insures that impulse radio transmissions interfere minimally with conventional radio systems. In some impulse radio systems, optimal energy smoothing is obtained by applying to each pulse a PN code component time dither having a much larger magnitude than the information component time dither.

Besides channelization and energy smoothing, the PN coding can also make impulse radio highly resistant to interference from all radio communications systems, including from other impulse radio transmitters. This is critical, as any other signals within the band occupied by an impulse signal can act as interference to the impulse radio. Because there are no unallocated bands at or above 1 GHz available for impulse radio systems, they must share spectrum with other conventional and impulse radios without being adversely affected. Using a PN code can help impulse systems discriminate between the intended impulse transmission and transmissions from others.

The impulse radio transmitter generally includes a time base, such as a voltage-controlled oscillator, that generates a periodic timing signal with sub-nanosecond timing accuracy. The periodic timing signal is supplied to a code source and a code time modulator. The code source is typically a storage device for storing pseudo-random noise (PN) codes that have low cross correlation among the codes in a set and will include means for generating a code signal representative of the code sequence. The code source monitors the periodic timing signal to permit the code signal to be synchronized to the code time modulator. The code time modulator uses the code signal to modulate the periodic timing signal for channelization and smoothing of a final emitted impulse radio signal. The output of the code time modulator is called the coded timing signal.

In many IR systems, the impulse radio receiver is a direct conversion receiver with a single conversion stage that coherently converts a series of pulses into a baseband signal. The baseband signal is the information channel for the basic impulse radio communications system. In such systems, pulse trains, not single pulses, are used for communications. Accordingly, the impulse radio transmitter in such systems generates a train of pulses for each bit of information. The data rate of such an impulse radio transmission is only a fraction of the periodic timing signal used as a time base. Each data bit modulates the time position of many of the pulses of the periodic timing signal. This yields a modulated, coded timing signal that comprises a train of identical pulses for each single data bit. Some impulse radio receivers typically integrate 200 or more pulses to yield the baseband output. Other systems use a "one pulse per bit" information transmission scheme. The number of pulses over which the receiver integrates is dependent on a number of variables, including pulse rate, bit rate, interference levels, and range.

An example of an ultra wideband impulse radio communication system having one subcarrier channel is shown in block diagram form in FIGS. 1a and 1b. The transmitter 602 (FIG. 1b) comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output signal 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 1a, through a propagation medium, such as air, in a radio frequency embodiment. In a preferred embodiment, the emitted signal is wide-band or ultrawide-band, approaching a monocycle pulse. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

The receiver 702 (FIG. 1a) is designed for reception of digital data wherein one or more pulses are transmitted for each data bit and comprises a receive antenna 704 for receiving a propagated impulse far radio signal 706. A received signal 708 from the receive antenna 704 is coupled to a cross correlator or sampler 710 to produce, a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by a lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,642,317, 4,813,057, and 4,979,186, which are incorporated herein by reference, and commonly owned and co-pending application Ser. No. 09/356,384, filed Jul. 16, 1999, titled: "Baseband Signal Converter Device for a Wideband Impulse Radio Receiver," which is also incorporated herein by reference.

The output of the correlator 710 (FIG. 1a), also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a low pass filter 742 (also referred to as lock loop filter 742). A control loop comprising the low pass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

As described with reference to FIG. 1a, the circuit or device in an impulse radio receiver that converts the received impulses into a baseband signal is sometimes referred to as a cross-correlator or sampler. The baseband signal converter of an impulse radio receiver typically integrates one or more pulses to recover the baseband signal that contains the transmitted information. One embodiment of a cross-correlator device usable in an impulse radio receiver is described in U.S. Pat. No. 5,677,927, issued Oct. 14, 1997, and assigned to Time Domain Corporation. The disclosure of the '927 Patent is incorporated in this specification by reference.

As noted above, prior art wideband impulse radio systems typically use a binary (or scalar) modulation/demodulation scheme in which the transmitter emits a wideband pulse whose time position is varied in response to two separate components: an information component and a pseudo-random (PN) code component. The PN code component functions, in a general sense, as a CDMA (Code Division Multiple Access) channel sequence. Binary time shift modulation can be implemented by shifting the coded time position by an additional amount (that is, in addition to the PN code dither) in response to the information signal.

In a typical system, the information component provides a modulation on the order of ¼ cycle of the pulse waveform. At the receiver, correlation occurs to determine if the transmitted pulse is early or late, with the result of this determination defining whether a digital "1" or "0" has been transmitted. Multiple pulses can be combined to improve the signal-to-noise ratio of the received signal, but this will cause a reduction in the rate at which data can be transmitted and received.

Using prior art modulation schemes in ultra-wide band impulse radio systems, the practical limitation on the maximum data transmission rate is one bit per pulse. In addition, there are limitations on the pulse rates that can be practically achieved. This suggests the need for methods of increasing the data rate without increasing the pulse rate or adversely degrading the bit error performance.

A typical prior art m-ary modulation scheme used in narrow band radio systems might use two correlators receiving the same signal shifted 90 degrees in phase. This yields a correlation function as shown in FIG. 2 where the I and Q channels represent the outputs of the two correlators such that the Q channel is shifted 90 degrees from the I channel. Four potential modulation states M1–M4 are shown as an example of the case where M is four. When these two functions are plotted with respect to one another, the plot of FIG. 3 results. The four modulation states M1–M4 are also shown in FIG. 3.

Again referring to prior art m-ary modulation, FIG. 4 is a plot of the two correlation functions when the sampling sine wave is 180 degrees. FIG. 5 shows these two functions plotted versus one another. It can be seen that when the modulation is separated by 180 degrees, the I correlator generates an inverted version of the output of the Q correlator. Thus, only two end points may be observed and, accordingly, fewer modulation states can be achieved using those end points and without resorting to amplitude variations.

What is needed, then, is a modulation method and system for use in wideband impulse radio communications that can provide data transmission rates in excess of one bit per pulse with acceptable bit error rate performance in the presence of noise.

SUMMARY OF THE INVENTION

In accordance with one object of the invention, a method and system have been developed for time modulating and demodulating wideband impulse radio signals to provide a data transmission rate in excess of one bit per pulse, while maintaining an acceptable bit error rate in the presence of noise. This improved data rate is achieved by a novel modulation scheme within the information component of the wideband impulse radio signal. Although time position modulation of the pulses is still used, the modulator portion of the impulse radio transmitter imposes multiple modulation states on each transmitted pulse. Multiple correlators (or baseband signal converters) in the impulse radio receiver can distinguish each of the multiple states so that each pulse can now communicate two or more bits of data.

In one embodiment of the novel modulation method of this invention, each transmitted pulse is modulated into one of four different time positions spanning a cycle of the pulse interval. Accordingly, four demodulation vector states, or quadrants, are determined relative to the correlator response function. These four transmitted time positions and demodulation vector quadrants correspond to two data bits of information: (0,0), (0,1), (1,0), and (1,1). In accordance with calling two state modulation binary, this method may be termed quaternary or more generally m-ary, where m can be any integer two and above, subject to system performance considerations. The value of m may be selected to be equal to an integer power of two for convenience in mapping to binary data. Thus where $m=2^n$, n data bits may be represented. In one embodiment designed to maximize the data rate, each pulse constitutes a "symbol", with data transmitted at n bits per symbol and one pulse per symbol. In another embodiment designed to improve the signal-to-noise ratio and/or to provide error correction, a sequence of multiple pulses, each modulated into the same relative time position or modulation position by the information signal, can be combined to form a single n bit data symbol by summing pulses to form a symbol. A variation of this embodiment requires the transmission and summation of a sequence of multiple pulses, each modulated into different time positions or modulation positions, to form a single n bit data symbol.

In the receiver, two correlators are used to demodulate the information component from each pulse, i.e., to estimate the values of the data bits being transmitted with each pulse. The first correlator observes each pulse at a reference point (the "I" channel) according to a reference clock while a second correlator observes each pulse at a time offset point (the "J" channel) from the reference clock. The second correlator is responsive to a decode timing signal used to trigger operation of the first correlator, but delayed by an amount of time, typically one-quarter to one-half of the RF pulse period. Each correlator typically includes an integrator and may include a sample and hold or track and hold circuit to overcome droop and other imperfections in practical high speed integrator circuits. These circuits are collectively referred to as the "correlator" for the remainder of this document.

The outputs from the correlators are supplied to a lock loop circuit that is responsible for acquiring and locking, i.e. synchronizing, the receiver time base with the transmitter time base. The lock loop circuit may include a thresholding circuit for acquiring the signal generated by the transmitter.

In one embodiment, the output of the I correlator is compared in a first comparator to a first reference voltage and the output of the J correlator is compared in a second comparator to a second reference voltage in order to estimate the values of the data bits being transmitted with each pulse. The reference voltages may be equal and may be adjusted with respect to each other in order to improve identification of the data bits transmitted with each pulse. In a second embodiment, the outputs of both correlators are compared in a comparator to a long term average output from each correlator, with the outputs of the comparators to achieve an estimate of the value of the two data bits associated with each pulse.

In a third embodiment, the output of the I correlator is summed with the output of the J correlator and the output of the I correlator is subtracted from the output of the J correlator. The summed value (I+J) is then compared in a first comparator to a first reference voltage and the subtracted value (I−J) is compared in a second comparator to a second reference voltage in order to estimate the values of the data bits being transmitted with each pulse. As before, the reference voltages may be equal and may be adjusted with respect to each other to improve identification of the data bits transmitted with each pulse.

In still another receiver embodiment, the analog I and J channel outputs from the first and second correlators are digitized and sent to a processor. The processor contains vector demodulation algorithms to estimate the value of the n data bits associated with each pulse. In one embodiment of a quaternary demodulation algorithm, the processor compares the digitized values of the I and J channel outputs for each pulse to a table of stored I and J channel value pairs. Four specified ranges of I and J channel value pairs are grouped in memory, with each group corresponding to expected scatter points associated with one of the four modulation states. Based on the results of this comparison, the processor provides an output representing the two data bits associated with that pulse: (0,0), (0,1), (1,0), or (1,1). The correlators and processor are then reset, so that processing of the next pulse can proceed.

If the wave shapes of the transmitted RF pulses are expected to be changed by environmental conditions near the receiver, the processor can implement additional algorithms to make adjustments in real time to maintain an acceptable degree of separation between the modulation states. In one embodiment, the processor can separately monitor the average values of the I and J channel outputs to determine if an acceptable amount of separation exists between modulation states. Alternatively, or in addition, the processor can store a sequence of scatter points generated by the I and J channel outputs and periodically compare them to an idealized plot of the expected scatter points in each modulation state or quadrant, as stored in memory. In either case, the processor can compensate for error by providing a signal to the J channel timing delay circuit that will vary the amount of delay between triggering of the I and J channel correlators, until separation among the four modulation states is optimized.

In a further embodiment, where transceivers are employed, the two transceivers can exchange signal performance information to determine the optimal modulation states for a given propagation path. This improvement is potentially significant since the pulse shape can be modified by objects or reflectors in the propagation path.

DESCRIPTION OF THE PREFERRED EMBODIMENTS

Figure 1:
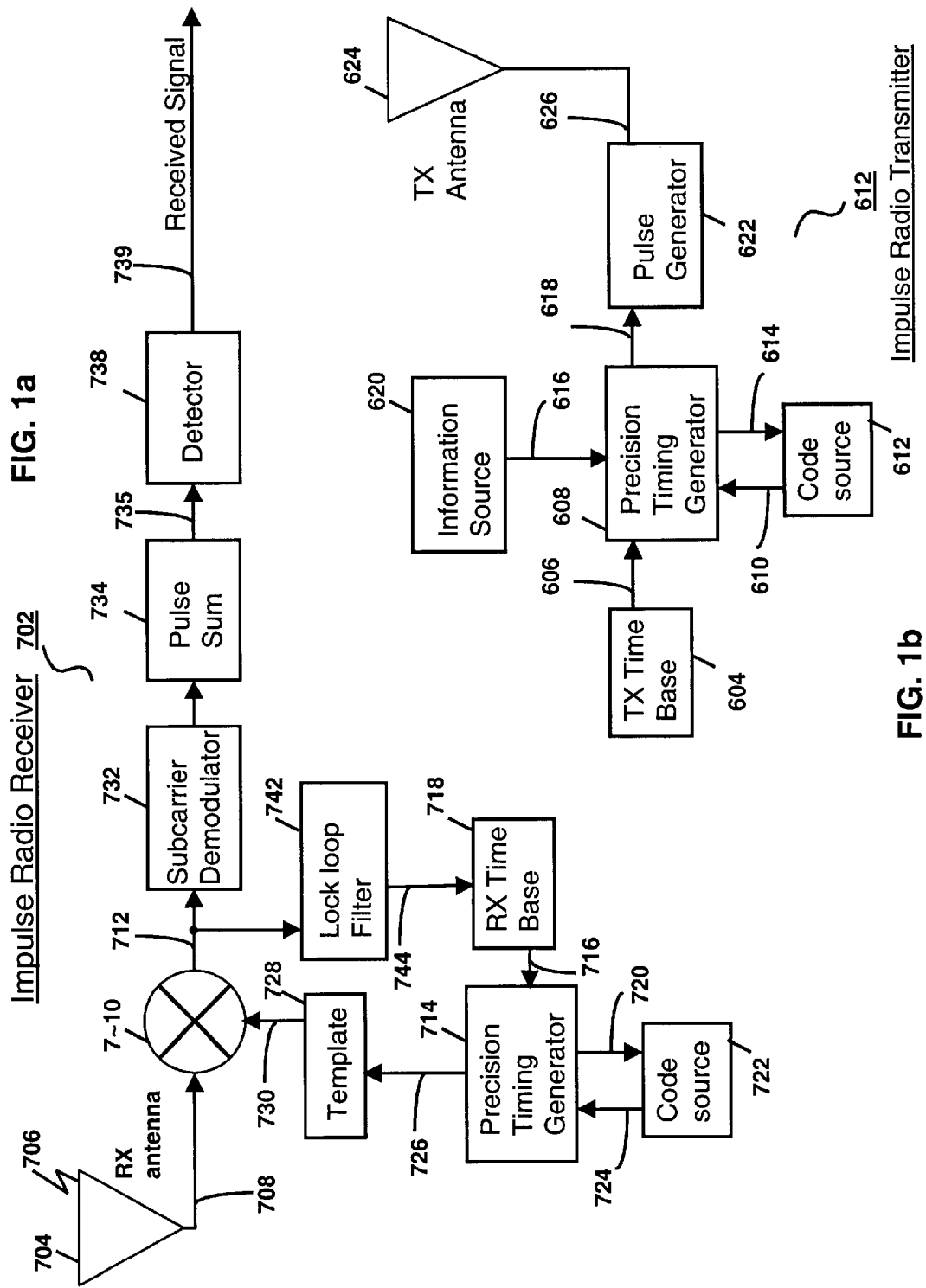
FIG. 1a and FIG. 1b are block diagrams of a transmitter and receiver used in a wideband impulse radio communications system.
Figure 2:
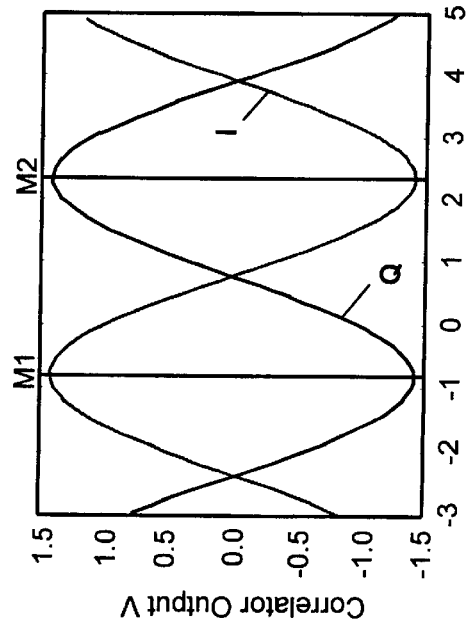
FIG. 2 shows the outputs of reference (I channel) and delayed (Q channel) correlators for a range of received pulse times using idealized sinusoidal wave shapes in a prior art m-ary modulation scheme.
Figure 4:
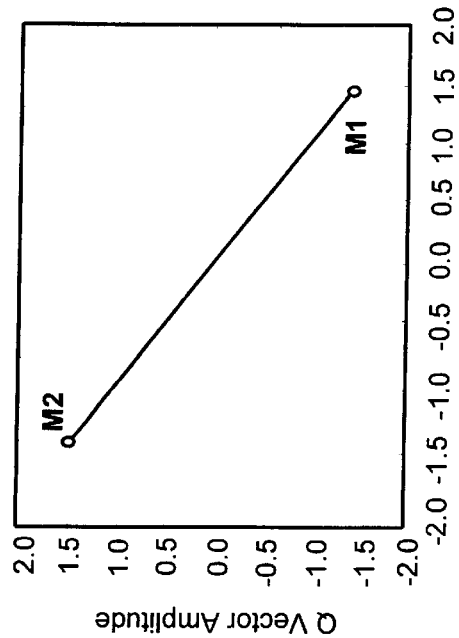
FIG. 4 is a plot of the two correlation functions in a conventional m-ary modulation system when the sampling sine wave is delayed 180 degrees.
Figure 3:
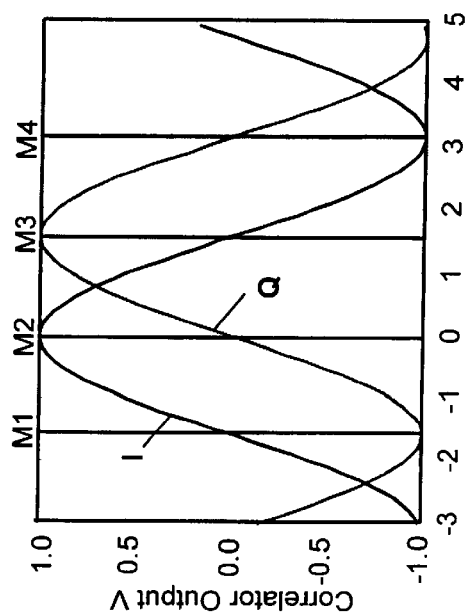
FIG. 3 is a polar plot of four possible modulation states of the I and Q channels generated in accordance with the correlator outputs shown in FIG. 2.
Figure 5:
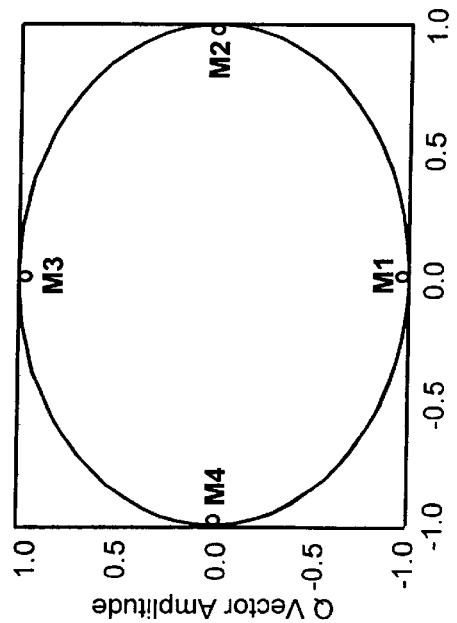
FIG. 5 is a polar plot of the possible modulation states of the I and Q channels generated in accordance with the correlator outputs shown in FIG. 4.

In ultra wideband impulse radio systems, the received pulse is so short that the correlation function is not identical for successive cycles. In fact, it can be so short that it essentially decays in the adjacent cycle. This gives rise to correlation functions that are non-sinusoidal and modulation state plots that are slightly to severely non-circular. This creates unique problems in modulation state design for these systems, as compared to prior art m-ary modulation techniques as reflected in FIGS. 2 and 3.

Figure 6:
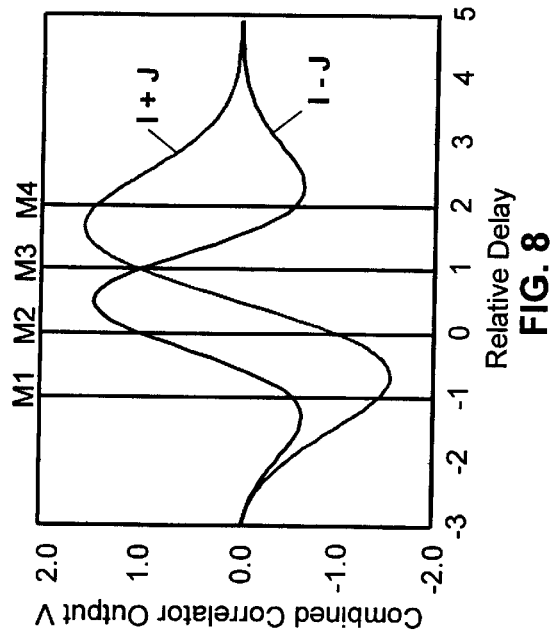
FIG. 6 is a plot of the correlation functions for a UWB system that transmits a Gaussian doublet and wherein the receiver uses a simple sampler for correlation.
Figure 7:
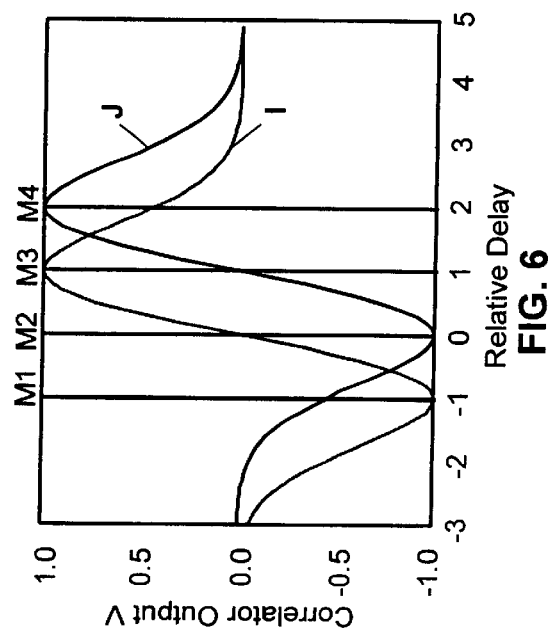
FIG. 7 is a polar plot of four possible modulation states of the I and J channels generated in accordance with the correlator outputs shown in FIG. 6.

The basic vector modulation method of the present invention can now be understood by reference to FIGS. 6 and 7. FIG. 6 represents the correlation function for a UWB system that transmits a Gaussian doublet and the receiver has a simple sampler. Although a Gaussian doublet is used in this example, various other input waveforms may be used as well. In this system, the I channel represents the output of the early channel as a function of pulse delay, and the J channel represents the corresponding output of the delayed channel. The points labeled "M1", "M2", "M3", and "M4" correspond to the magnitudes of the I and J correlator outputs at points delayed in time. The relative magnitudes of the I and J outputs from FIG. 6 are plotted on FIG. 7, with the "M1", "M2", "M3", and "M4" points of FIG. 6 also marked. Thus, the vector position of the point (I, J) is a function of the time delay of the J correlator with respect to the I correlator. When these two functions are plotted one against the other, the plot of FIG. 7 is produced. The locus is seen to begin at the origin and travel through two extremes in each axis and then return to the origin. Note that there is not a strict quadrature relationship between these two functions, that is, where one passes through a maximum, the other does not pass through zero. Note that modulation state M1 is placed at the first maximum of correlator I output. However, the output of the J correlator is not zero but −0.4. Four potential modulation states are identified by M1–M4 so that two data bits (0,0), (0,1), (1,0), and (1,1) can be communicated by the magnitude of the delay. These principles form the basis of the novel modulation method and system for use in a wideband impulse radio system.

Figure 8:
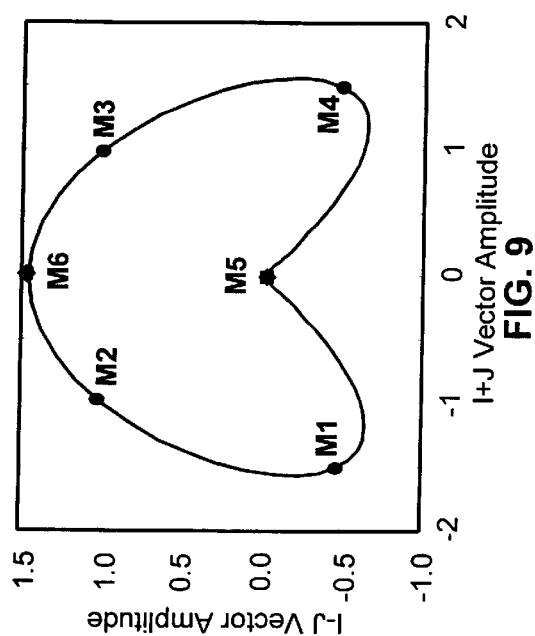
FIG. 8, is a plot of a linear combination (I+J and I−J) of the I and J correlator outputs shown in FIG. 6.

FIG. 8 represents a linear combination of the I and J outputs that produces a convenient symmetry in response. When the two outputs are mixed to produce an I+J and I−J output the plot of FIG. 8 results. In this figure, the same modulation states M1–M4 are illustrated for comparison. Note that in this case, they no longer correspond to response maximums. When these two functions are plotted versus one another, the plot of FIG. 9 results, where the symmetry can be easily observed. This symmetry allows one to use a simple threshold to separate modulation states. The right and left halves which separate M1 and M2 from M3 and M4 can be separated by a simple zero threshold on the I+J value. Likewise, the upper and lower halves which separate M2 and M3 from M1 and M4 can be separated by a simple threshold of approximately 0.25 on the I−J value.

Figure 9:
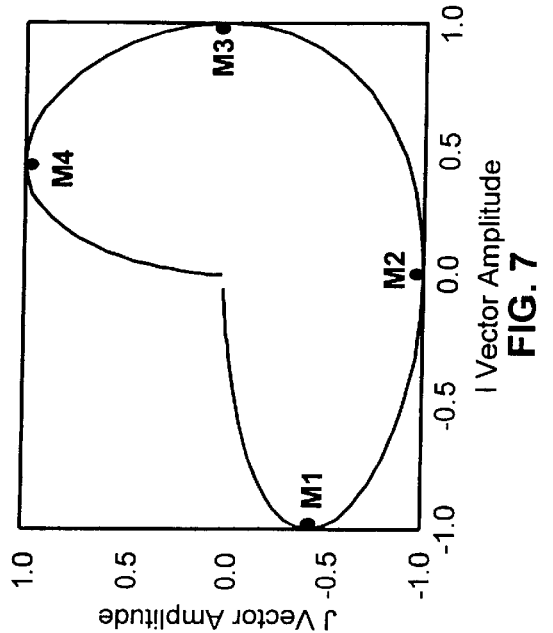
FIG. 9 is a polar plot of six possible modulation states of the I and J channels generated in accordance with the combined correlator outputs shown in FIG. 8.

An alternative set of modulation points M5 and M6 is available on FIG. 9. This set of points has one (M6) positioned at the maximum response of I−J and one (M5) at the origin. Since this represents a signal delay outside of the correlation response, the pulse may simply be turned off during this time period. For a system with a fixed average power, this will allow higher power in the remaining modulation states, thus indirectly providing higher signal to noise.

Figure 12:
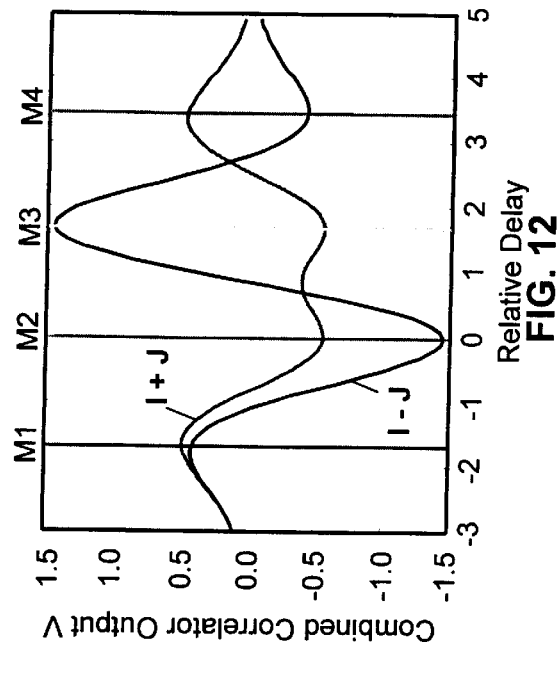
FIG. 12 is a plot of a linear combination (I+J and I−J) of the I and J correlator outputs shown in FIG. 10.
Figure 13:
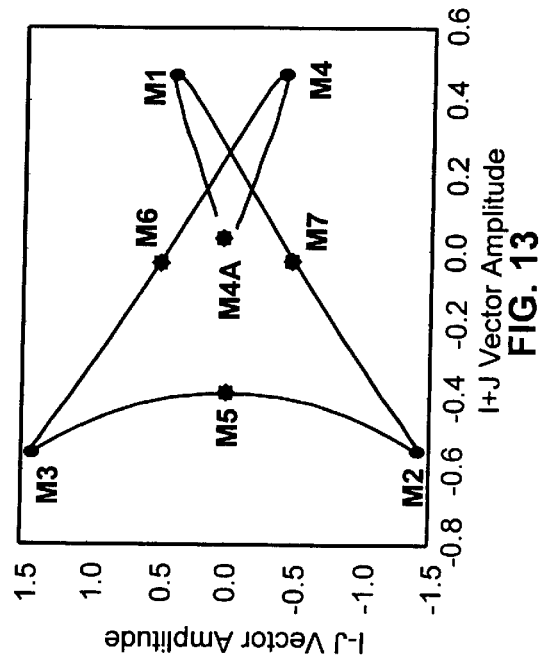
FIG. 13 is a polar plot of some of the possible modulation states of the I and J channels generated in accordance with the combined correlator outputs shown in FIG. 12.
Figure 10:
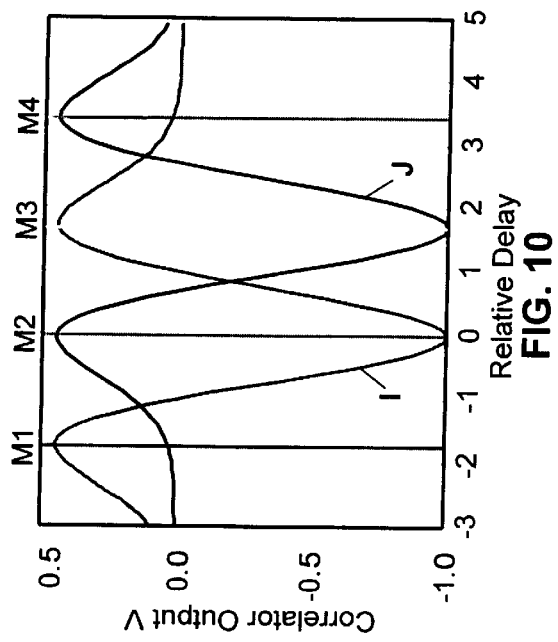
FIG. 10 is a plot of the I and J correlator outputs where the input function is the second derivative of the Gaussian pulse and the correlation function is a simple sampling function, or the case where the input and correlation functions are the first derivative of the Gaussian pulse.
Figure 11:
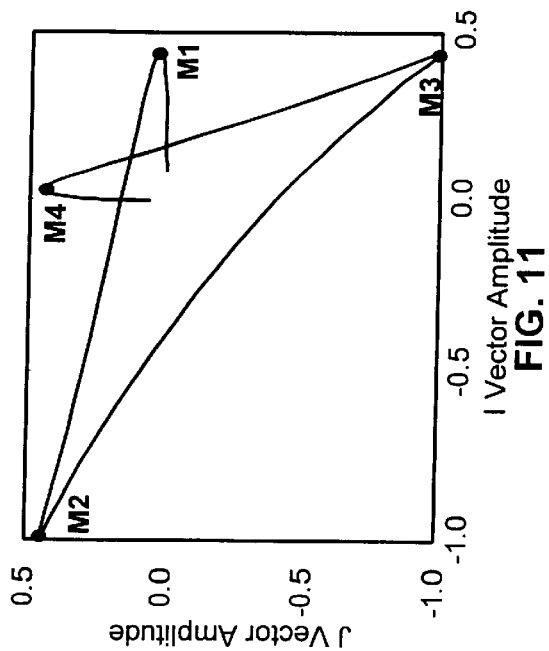
FIG. 11 is a polar plot of four possible modulation states of the I and J channels generated in accordance with the correlator outputs shown in FIG. 10.

FIG. 10 represents the I and J correlator outputs where the input function is the second derivative of the Gaussian pulse and the correlation function is a simple sampling function, or the case where the input and correlation functions are the first derivative of the Gaussian pulse. At the delay shown in FIG. 10, three states are easily separated, as shown in FIG. 11. Again the symmetry of the linear combinations I+J and I−J (shown in FIGS. 12 and 13) allows simple decoding of the modulation by comparing with simple thresholds. Note that the modulation states M1 and M4 are not as distinctly separated as the others, even when M4 is defined at the origin as M4a. Three states may easily be utilized in a binary system by mapping over several symbols or by utilizing error correcting codes with appropriate rates, as discussed elsewhere in this application. Additional states may be placed on this map for systems where the signal to noise and system clock stability permit. For example M5–M7 (FIG. 13) may be added to the base set of M1–M4 to further increase the data rate.

FIGS. 18–21 illustrate the same correlation function as FIGS. 10–13 but with a different delay between the correlators. With this delay value, the magnitude of the response is diminished, however four distinct positions can now be identified as modulation states. Again, the I+J and I−J combination allows simple detection of the modulation.

Figure 14:
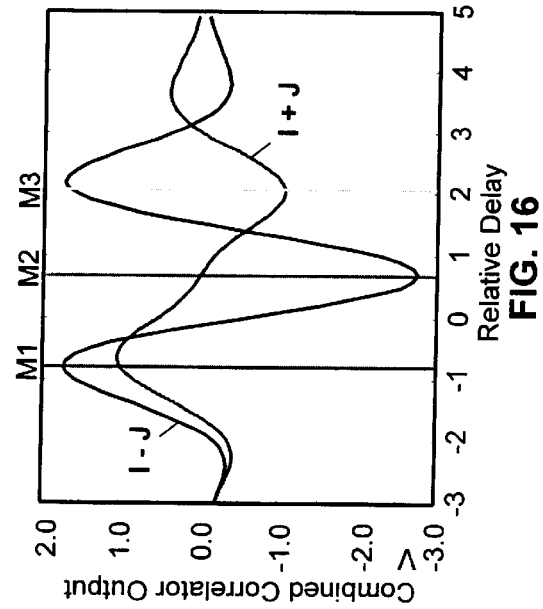
FIG. 14 is a plot of I and J correlator outputs where the correlation function is the third derivative of the Gaussian function and where the J correlator ouput is delayed such that the second peak of the I correlator output coincides with the first peak of the J correlator output.
Figure 15:
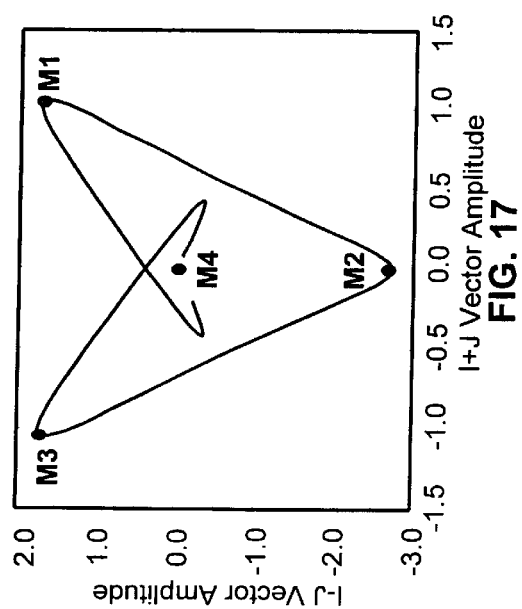
FIG. 15 is a polar plot of four possible modulation states of the I and J channels generated in accordance-with the correlator outputs shown in FIG. 14.
Figure 16:
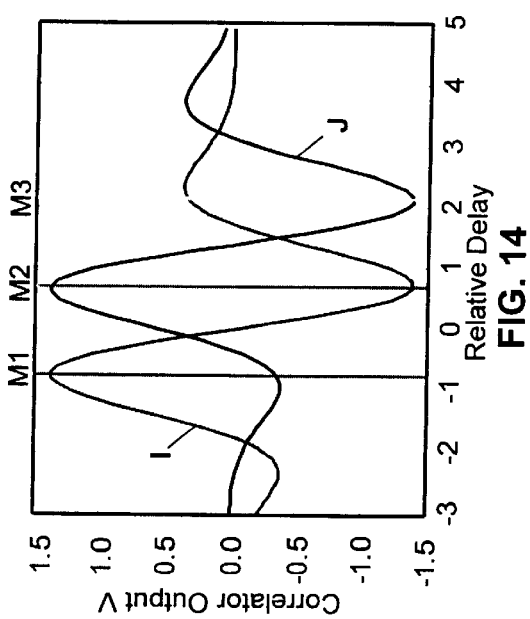
FIG. 16 is a plot of a linear combination (I+J and I−J) of the I and J correlator outputs shown in FIG. 14.
Figure 17:
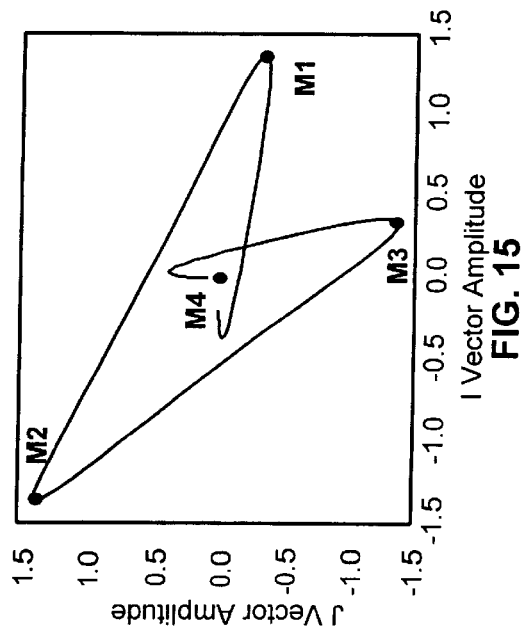
FIG. 17 is a polar plot of some of the possible modulation states of the I and J channels generated in accordance with the combined correlator outputs shown in FIG. 16.
Figure 18:
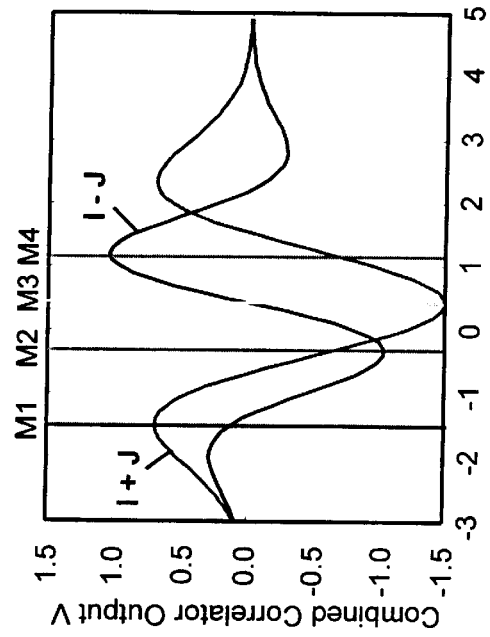
FIG. 18 is a plot of the I and J correlator outputs as shown in FIG. 10, but with a different delay between the correlators.
Figure 20:
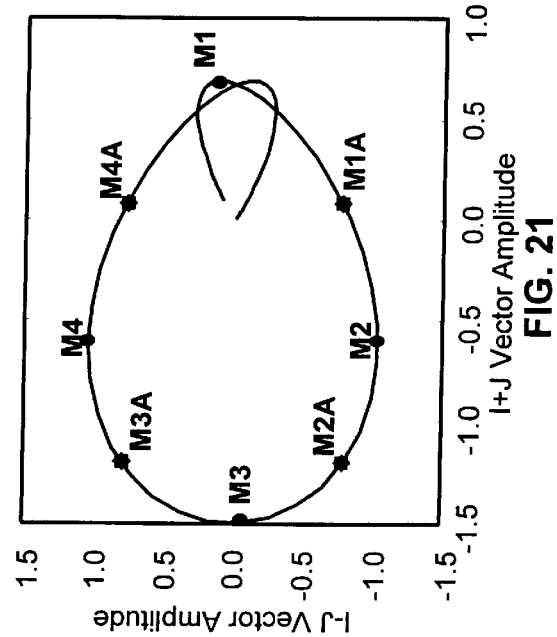
FIG. 20 is a plot of a linear combination (I+J and I−J) of the I and J correlator outputs shown in FIG. 18.
Figure 19:
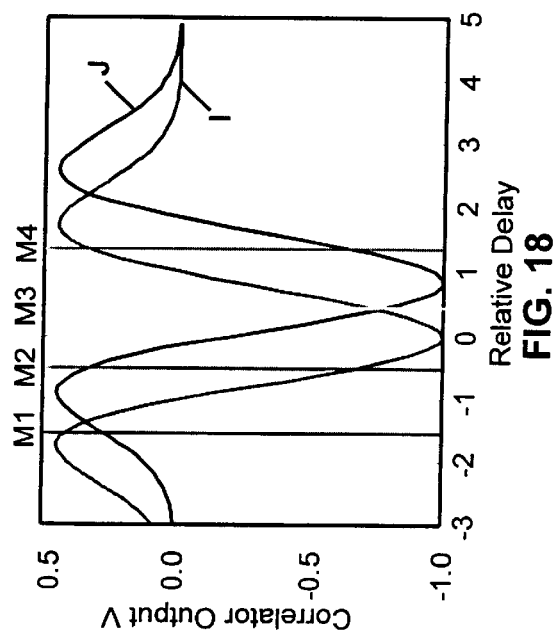
FIG. 19 is a polar plot of the possible modulation states of the I and J channels generated in accordance with the correlator outputs shown in FIG. 18.
Figure 21:
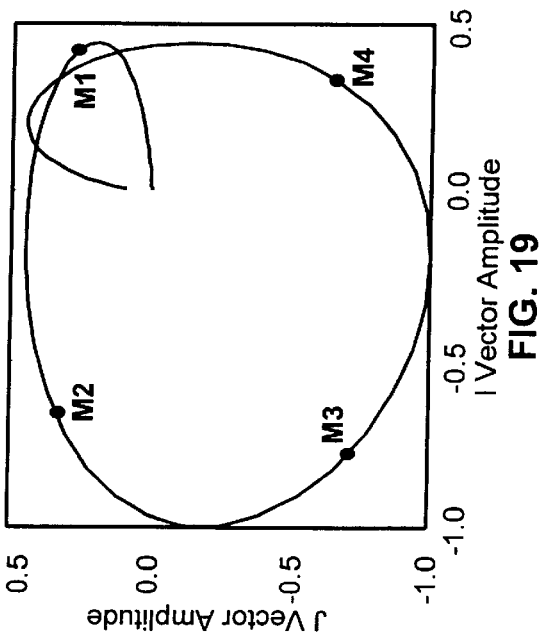
FIG. 21 is a polar plot of some of the possible modulation states of the I and J channels generated in accordance with the combined correlator outputs shown in FIG. 20.

FIGS. 14–17 illustrate the case where the correlation function is the third derivative of the Gaussian function. FIG. 14 illustrates the I and J correlator outputs delayed such that the second peak of the I correlator output coincides with the first peak of the J correlator output. FIG. 15 shows these functions plotted vs. one another and FIGS. 16 and 17 illustrate the I+J and I−J combination of these functions. FIG. 17 illustrates three clear extremes M1–M3 with a fairly symmetrical center at M4. Again, the pulse associated with M4 need not be transmitted. This energy can be better placed into M1–M3. Again, more states can be placed on this function where system signal to noise and timing stability permits. The M1–M4 modulation states shown in FIG. 17 may be separated by three thresholds. M1 and M3 can be separated from M2 by a threshold at zero volts on I−J. M1 can then be separated from M3 by a threshold at zero volts on I+J. M4 (no pulse) can be separated by an amplitude measure such as $((I>1)$ and $(J>1))$ or $\text{sqrt}(I^2+J^2)>1.5$ or another test serving to threshold at about ½ full amplitude.

Figure 31:
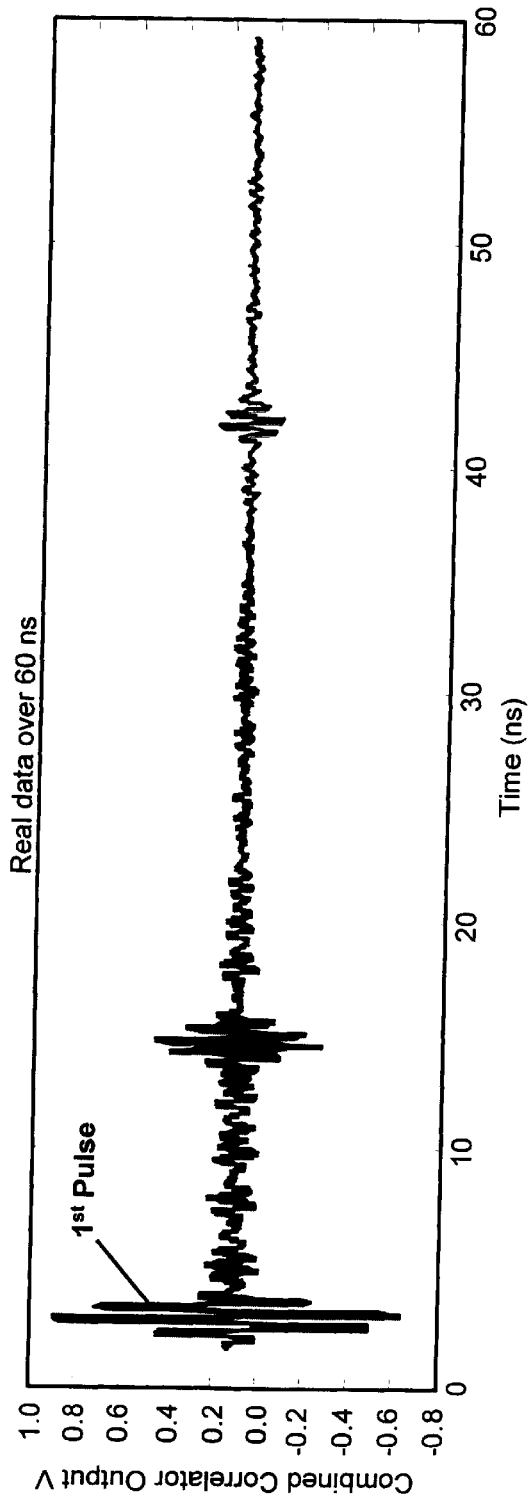
FIG. 31 is a plot of a correlator output versus time for a real world received UWB pulse.
Figure 32:
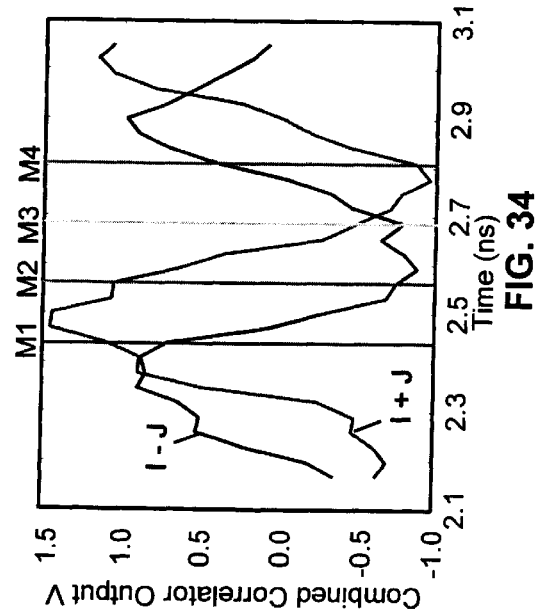
FIG. 32 is a plot of the correlation functions from two delayed correlators wherein the pulse waveform corresponds to the "$1^{st}$ pulse" portion of FIG. 31.
Figure 33:
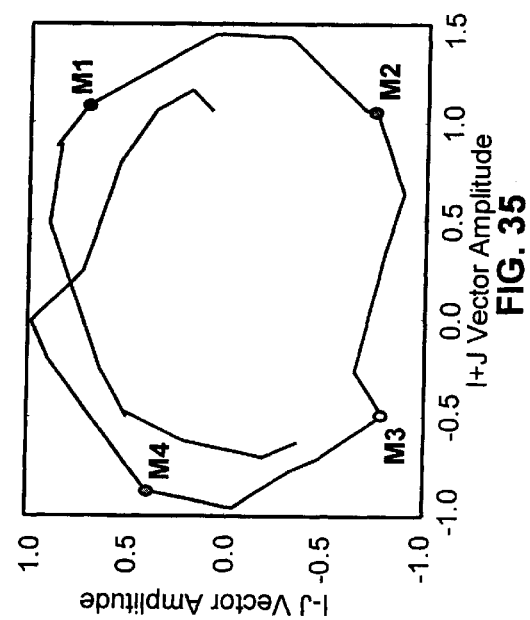
FIG. 33 is a polar plot of the four possible modulation states of the I and J channels generated in accordance with the correlator outputs shown in FIG. 32.
Figure 34:
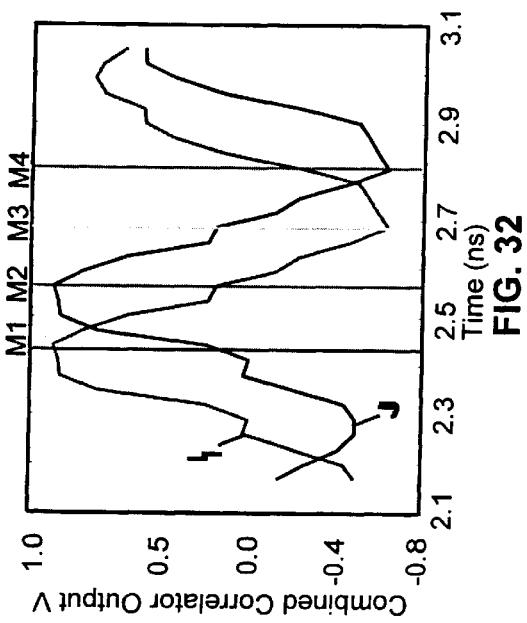
FIG. 34 is a plot of a linear combination (I+J and I−J) of the I and J correlator outputs shown in FIG. 32.
Figure 35:
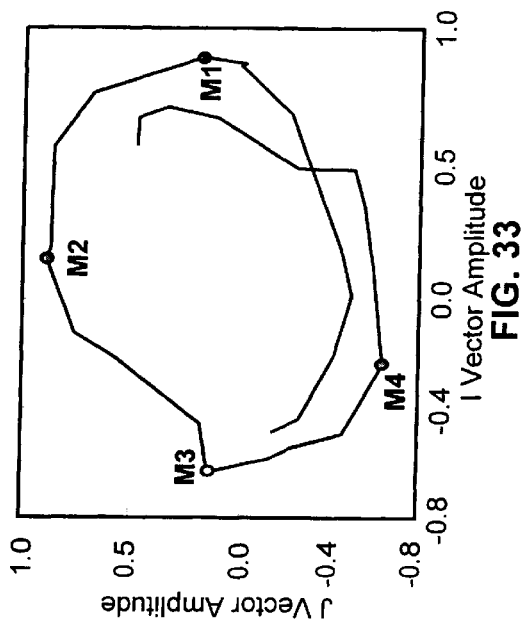
FIG. 35 is a polar plot of some of the possible modulation states of the I and J channels generated in accordance with the combined correlator outputs shown in FIG. 34.

FIG. 32 represents the I and J correlator outputs where the input function is the "$1^{st}$ pulse" portion shown in FIG. 31. FIG. 31 is a plot of a correlator output versus time for a real world received UWB pulse. At the delay shown in FIG. 32, four states are easily separated, as shown in FIG. 33. The symmetry of the linear combinations I+J and I−J (shown in FIGS. 34 and 35) allow simple decoding of the modulation by comparing with simple thresholds.

Multipath Reception

It is a common occurrence that for extreme multipath environments there may be a multipath response that is stronger than the direct path. This occurs because several multipath reflections may sum to increase the signal strength over the direct path whereas the direct path cannot sum with another path to increase its strength. When this occurs, the multipath reflection may be the best signal path for data communications. This response however, is likely to have an altered wave shape. This response is from several multipath reflections that are near the same delay, but probably not exactly the same delay. Also, the reflection process itself may be narrow band or otherwise alter the pulse shape. Thus the particular lobe on a multipath response may be narrower or broader than the nominal direct path response, or may have flat top or double peak structure. To further complicate the situation, motion in the area either by the transmitter or receiver or by anything in the environment can shift the multipath mix at any given time offset. This presents problems for multiple state modulation that depends on a particular waveform and time delay to yield optimum or even usable results.

This problem can be overcome by several adaptive techniques. A first method is adaptive receiver delay. The delay between the correlators is made adjustable and adjusted according to a data quality measurement. A second method requires feedback to the transmitter and the transmitter modulation state positions are made adaptively adjustable according to receiver measured data quality measurements.

Vector Modulation Methods and Systems for Ultra Wideband Impulse Radio

Figure 22:
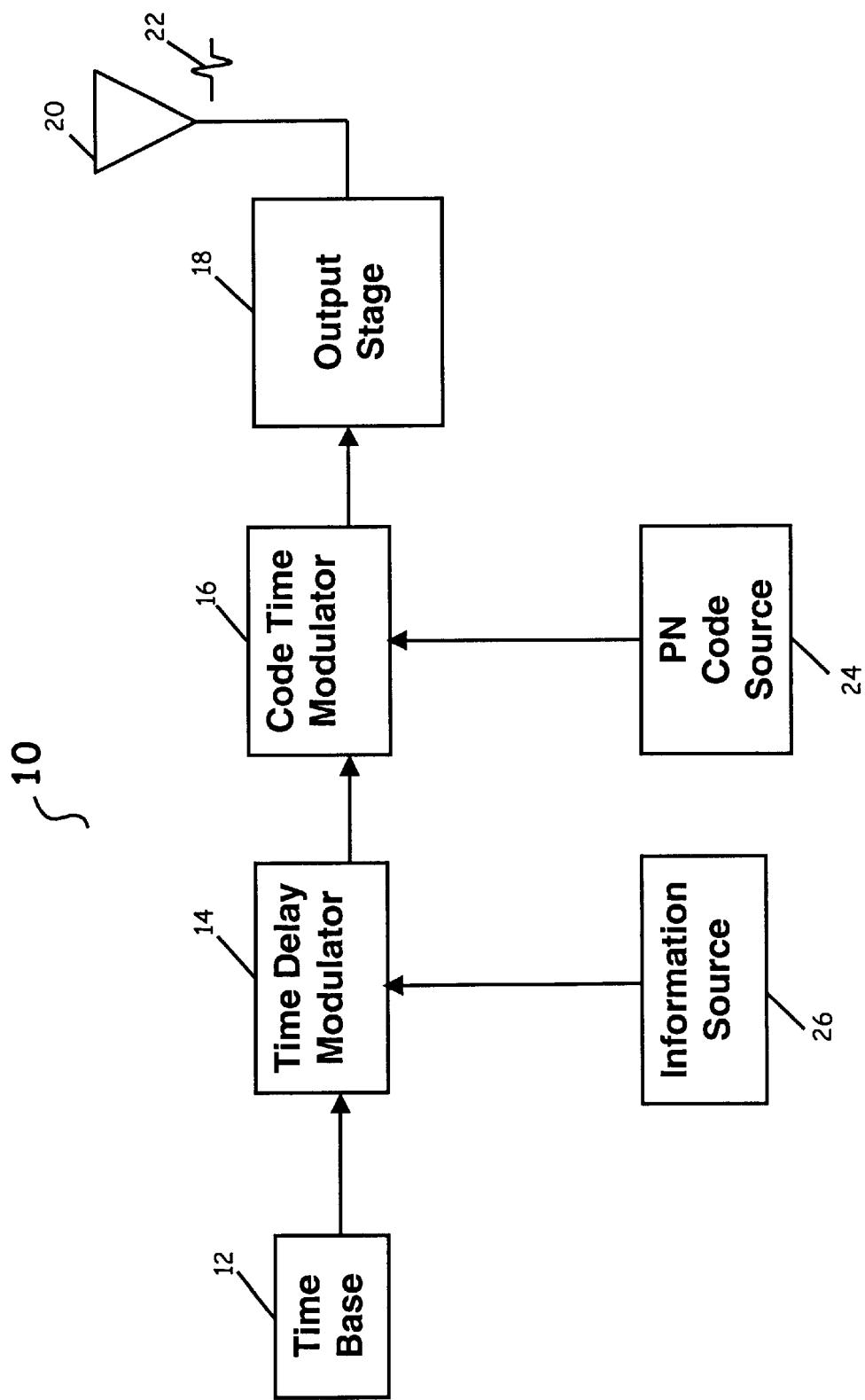
FIG. 22 is a block diagram of one embodiment of a wideband impulse radio transmitter used in the communications system of the present invention.

FIG. 22 is a block diagram of a wideband impulse radio transmitter 10 that can be used to implement the vector modulation method of the present invention. A precision time base 12 provides a periodic timing signal to a time delay modulator 14. The output of time delay modulator 14 is coupled to a timing input on a code time modulator 16. The output of the code time modulator 16 is coupled to a transmitter output stage 18. The output stage 18 generates wideband RF pulses in response to timing signals received from code time modulator 16. The output stage 18 is connected to an antenna 20 so that the wideband RF pulses 22 can be emitted and received by a wideband impulse radio receiver. Although FIG. 22 depicts the time delay modulator 14 and code time modulator 16 as separate blocks, in alternative embodiments the time delay modulator 14 and code time modulator 16 may be combined together.

The RF pulses generated by transmitter 10 are time modulated by both time delay modulator 14 and code time modulator 16. Code time modulator 16 varies the time position of the RF pulses in accordance with a PN code stored in PN code source 24. The PN code source is preferably unique to each transmitter so that the PN code can provide channelization, much as a CDMA code does in a conventional spread spectrum radio.

The time delay modulator 14 is responsive to an information source 26, and provides the time position modulation of the RF pulses that conveys the information (voice and/or data) that needs to be communicated from the transmitter to the receiver. In accordance with one embodiment of the novel vector modulation method of this invention, the time delay modulator 14 is configured to delay each RF pulse by one of four predetermined time delay periods, such as the delays represented in FIGS. 6, 10, 14, or 18. One of the four delay periods is chosen depending on the values of the next two bits of data to be transmitted from information source 26. For example, if the next two data bits are (1,1), then the delay imposed by time delay modulator 14 to represent this could be chosen to correspond to point M4 on FIGS. 6 and 7. In other words, to communicate n bits of information of a single pulse, $2^n$ modulation states have to be established by the time delay modulator, and points selected on a correlation of the I and J waveforms that provide an acceptable separation between the modulation states.

Figure 23A:
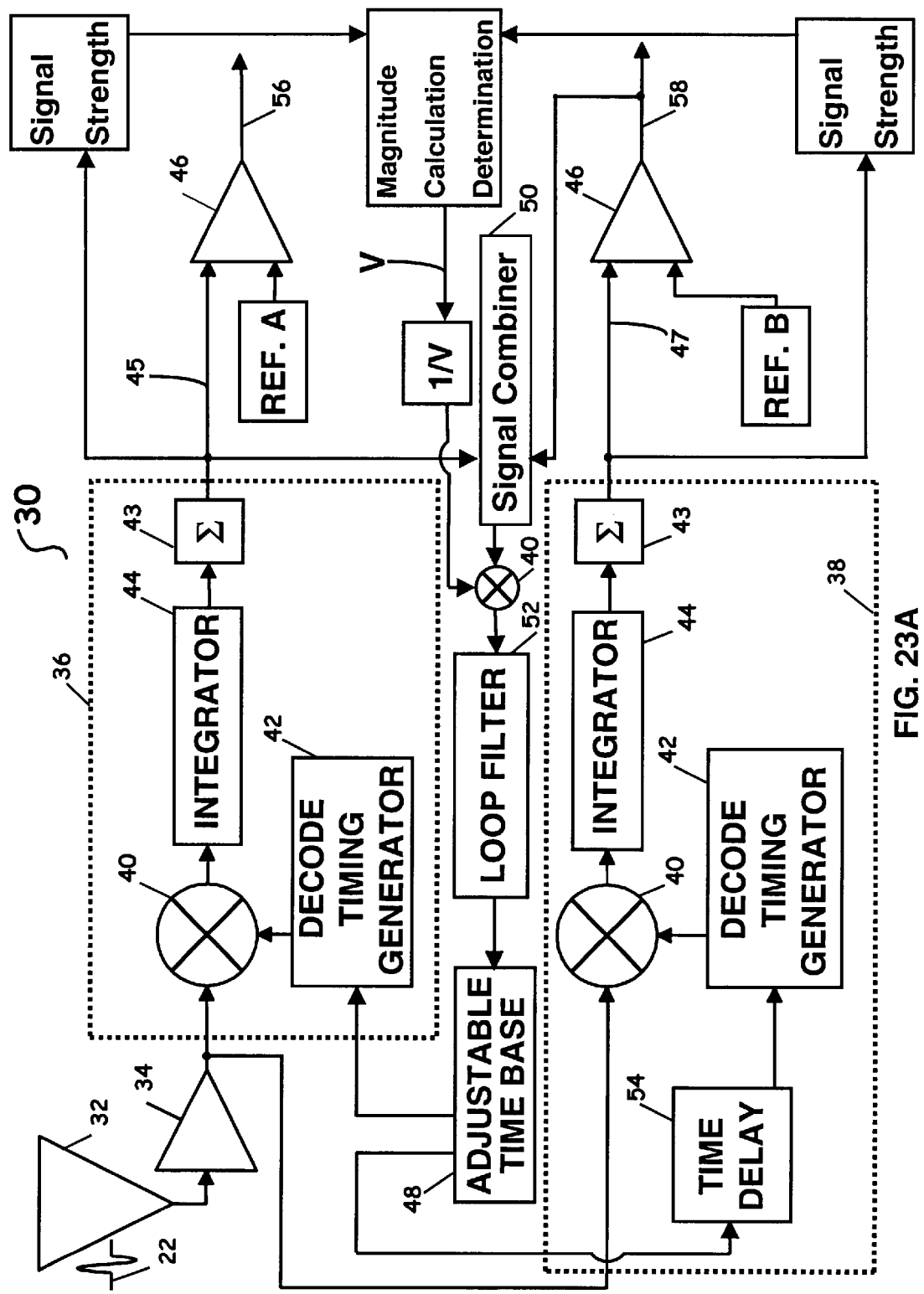
FIG. 23a is a block diagram of a first embodiment of a wideband impulse radio receiver used in the communications system of the present invention.

Accurate demodulation of the information component of the time modulated wideband pulses requires a novel method of determining which of the four modulation states has been imposed on each of the received RF pulses. One embodiment of a wideband impulse radio receiver 30 designed to implement such a method is shown in FIG. 23a. The transmitted wideband RF pulses 22 are captured by antenna 32 and amplified in an optional wideband RF amplifier 34. The pulses are then supplied to the inputs of I channel and J channel correlators 36 and 38. The function of the I channel correlator 36 is to provide a reference output "I" while the J channel correlator 38 provides a time delayed offset output "J." Accordingly, each correlator 36 and 38 includes a multiplier circuit 40, each receiving RF pulses from RF amplifier 34 and from a decode timing generator 42. Each decode timing generator 42 is operative to generate a sequence of narrow timing pulses corresponding to the PN code used in transmitter 10 (FIG. 22) to time modulate the RF pulses. The output of each multiplier 40 is a pulse that is integrated by corresponding integrator 44.

The output of each integrator 44 is connected to the input of a corresponding comparator 46. The second input to each comparator is connected to a predetermined reference voltage. For example, the reference voltage in one embodiment is zero volts for both the I and J comparators 46. The outputs, 56 and 58, of the I and J comparators 46 are indicative of the modulation states imposed on received pulses by the transmitter 10 and thus provide information regarding the two data bits from the transmitter information source 26 associated with the received pulses.

In accordance with one novel aspect of the vector modulation system and method, the decode timing generator 42 in I channel correlator 36 is triggered by an adjustable time base 48 that is synchronized to time base 12 in transmitter 10 (FIG. 22) using a signal combiner 50 and loop filter 52. The signal combiner 50 and loop filter 52 are connected to the outputs of the integrators 44 and will be described in more detail below. Decode timing generator 42 in J channel correlator 38 is also triggered by adjustable time base 48 but only after a pre-determined delay period established by adjustable time delay circuit 54. In this embodiment, the delay period used for J channel correlator 38 is chosen to correspond to points M1, M2, M3, or M4 on FIG. 6. This provides an increased amount of separation between the four modulation states.

In an embodiment designed to improve the signal to noise ratio, an optional summer 43 is included between integrators 44 and comparators 46 in both the I and J correlators. In this embodiment, a predetermined number of multiple pulses having the same modulation state are transmitted by the transmitter 10. The summers 43 included in the receiver 30 sum the outputs of the integrators 44 for the predetermined number of pulses and compare the summed value to a reference voltage using comparators 46. As a result, the modulation state associated with the predetermined number of pulses may be estimated. In a variation on this embodiment, a predetermined group of multiple pulses having different modulation states is repeatedly transmitted by the transmitter 10. Each transmitted group is representative of a single modulation state. The summers 43 included in the receiver 30 sum the outputs of the integrators 44 for each predetermined group of pulses and compare the summed value to a reference voltage using comparators 46. As a result, the modulation state associated with each predetermined group of pulses may be estimated.

Figure 23B:
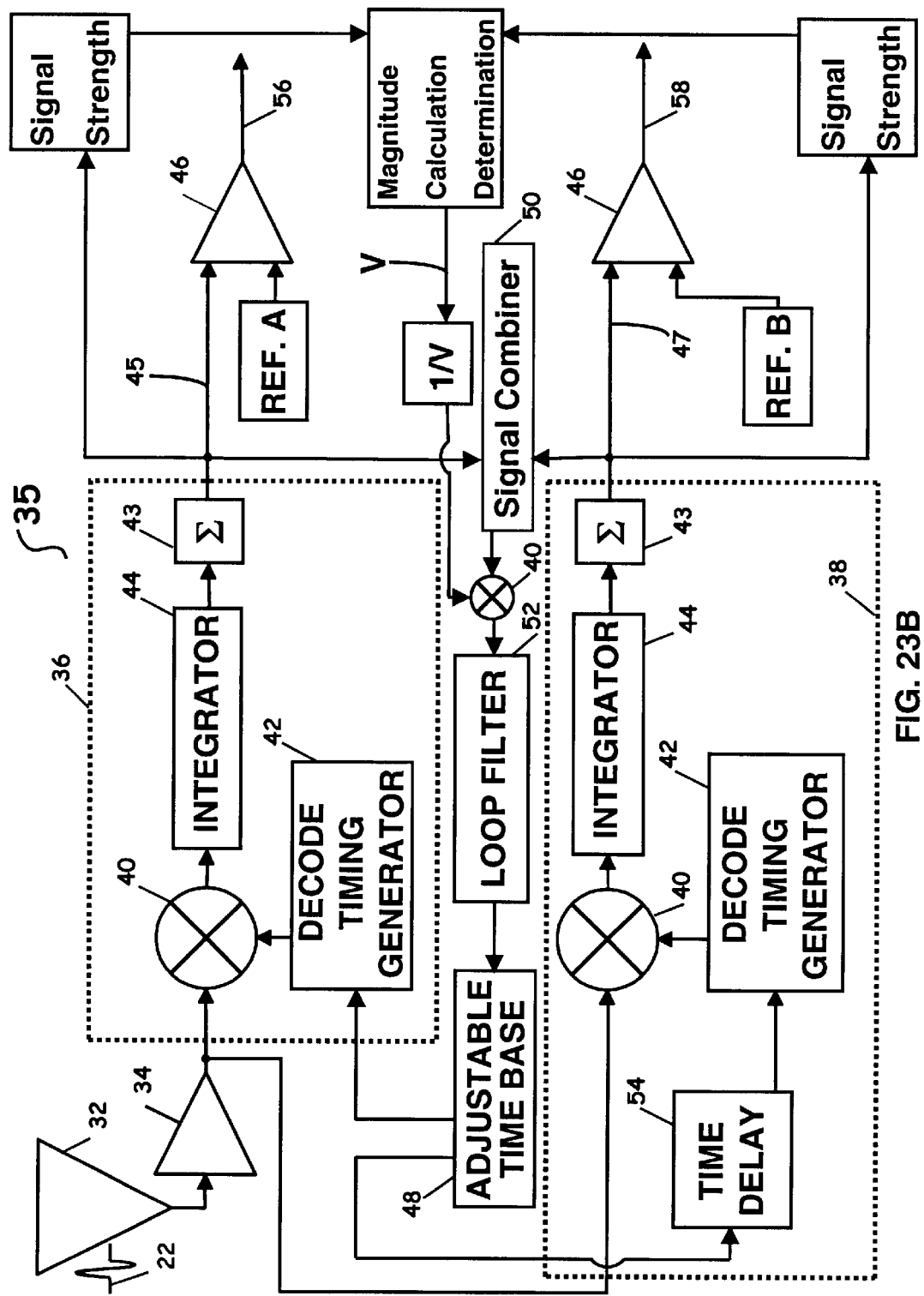
FIG. 23b is a block diagram of a second embodiment of a wideband impulse radio receiver having track and hold circuits used in the communications system of the present invention.

In another embodiment, the output of each integrator 44 is provided to an input on a corresponding track and hold circuit 64 (as shown in FIG. 23b). Track and hold circuit 64 tracks the output of integrator 44 while each received pulse is integrated by the integrator 44 and holds the value output by the integrator 44 after each pulse has been integrated. Thus, the output of each track and hold circuit 64 is a DC voltage that corresponds to the value of a received RF pulse at the end of the tracking period. In an alternative embodiment, a sample and hold (not shown) may be used in place of the track and hold.

After correlation of each RF pulse, delay circuits 66 cause the track and hold circuits to reset. There are a number of known circuits and methods for integrating, tracking, and holding wideband RF pulses in response to various timing signals. Applicants co-pending U.S. patent application Ser. No. 09/356,384, filed Jul. 16, 1999, and incorporated in this application by reference, describes a baseband converter device that can be adapted for use in the receiver shown in FIG. 23b.

Using this novel demodulation technique, the outputs of the track and hold circuits 64 will indicate the relative time positions of the RF pulses, as modulated by the information component, at a first reference point established by I channel correlator 36 and at a delayed or time offset established by J channel correlator 38. If the track and hold output of each correlator 36, 38 is provided to one input of corresponding comparators 46, with the other comparator inputs connected to ground, then the voltages at I channel output 68 and J channel output 70 will together indicate which of the four modulation states has been imposed on each pulse. That information is representative of two data bits from the transmitter information source 26 (FIG. 22). For example, if the output of both the I and J correlators are above a predetermined voltage, then the data transmitted by the transmitter 10 corresponds to the data 00. If the output of the I correlator is low and the J correlator output is high, the data transmitted by the transmitter 10 is 01. If the I correlator output is high, and the J correlator output is low, the data corresponds to 10. Finally, if the output of both the I and J correlators is low, the transmitted data corresponds to 11.

Although FIGS. 23a and 23b include an adjustable time base 48 and a single adjustable time delay circuit 54, practical hardware limitations inherent in typical time delay circuits may require the use of two adjustable time delay circuits in order to achieve the desired delay between the I and J correlators, 36 and 38. Specifically, the time delay periods necessary between the I and J correlators, 36 and 38, may be shorter than the shortest time delay achievable by typical time delay circuits. In other words, the time delay period achievable by typical time delay circuits is greater than the time delay needed between the I and J correlators, 36 and 38. As a result, the time base 48 shown in FIGS. 23a and 23b may include an additional adjustable time delay circuit (not shown) connected between the time base 48 and the decode timing generator 42 in the I correlator 36. A controller (not shown) may be used to adjust each of the adjustable time delays to obtain the desired delay between the I and J correlators, 36 and 38.

Figure 24:
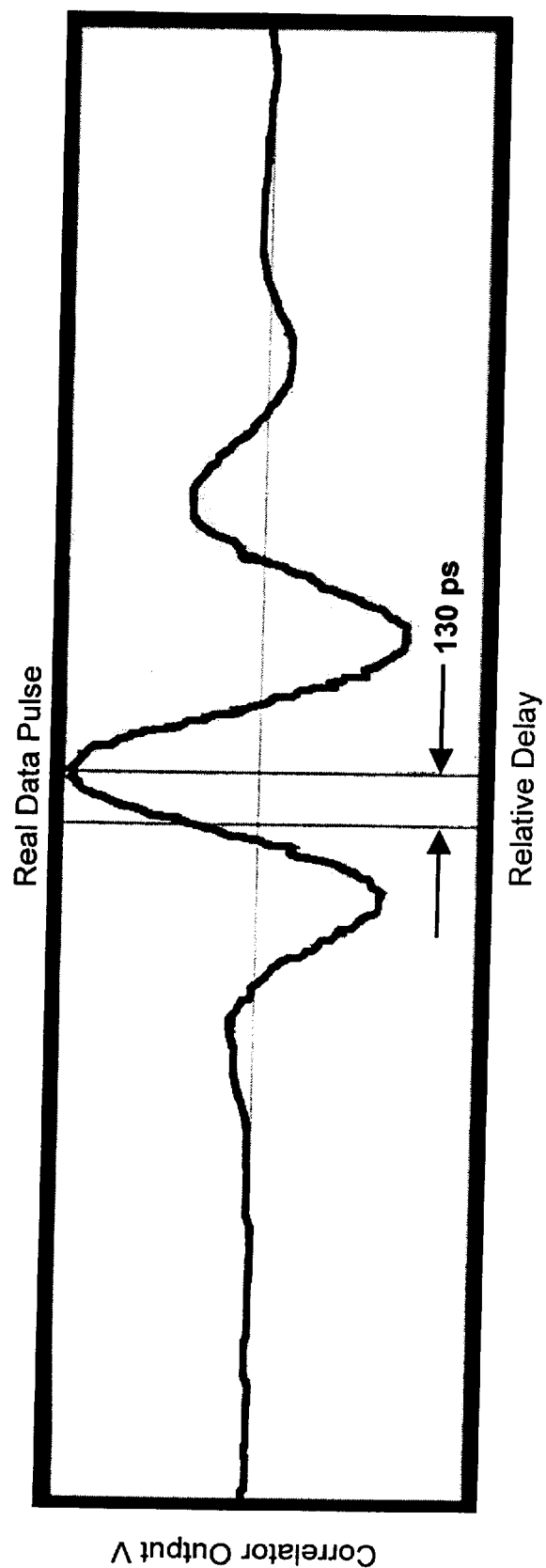
FIG. 24 is a plot of correlator output versus time in response to an actual received UWB pulse that may be distorted by building walls or other environmental conditions after transmission, wherein the transmitted pulse is similar to that shown in FIG. 14.
Figure 25:
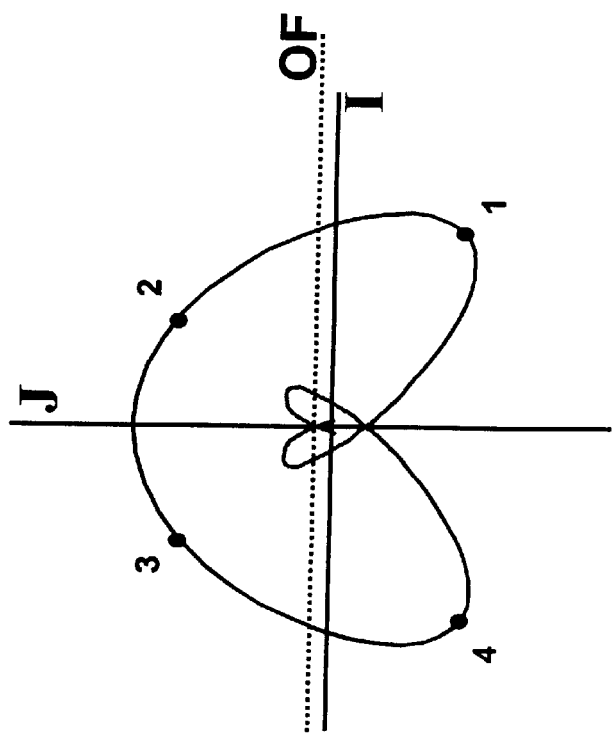
FIG. 25 is a polar plot of the I and J channel outputs generated by wideband RF pulses having a non-idealized wave shape.

As discussed above, an ideal sinusoidal waveform is not achievable in a real world wideband impulse radio system, due in part to waveform distortion created by environmental conditions between the transmitter 10 and receiver 30. For example, FIG. 24 represents the output of a correlator in response to a "real world" pulse received by a receiver 30 after passing through and being distorted by a building wall. Therefore, an actual polar plot of the I and J channel correlator outputs corresponding to varying RF pulse positions may look more like FIG. 25. This can increase the probability of error by shifting or reducing the separation between the four modulation states. Looking at FIG. 25, the nominal modulation states are now centered around off axis points "1", "2", "3", and "4", with a DC offset shown at line "OF." A receiver embodiment shown in FIG. 23b can help correct such error by coupling the second inputs of each comparator 46 to an averaging circuit (not shown). Each averaging circuit establishes a long term average of the value the respective I channel and J channel signals, so that if a DC offset is present, the actual value obtained through integration of each individual RF pulse is compared to the average, rather than to a theoretical zero voltage which would be present if no DC offset was created by a distorted wave shape.

Figure 26:
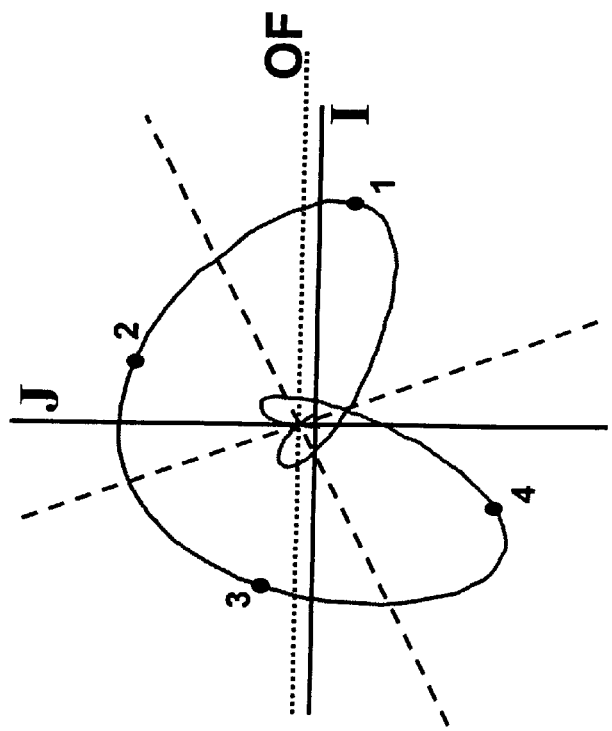
FIG. 26 is a polar plot of the four possible modulation states of the I and J channels generated in accordance with an embodiment of the vector modulation method of this invention, showing an angular skew and DC offset created by reception of a non-idealized pulse wave form and the I and J channel outputs shown in FIG. 25.

Another method of compensating for angular skews and DC offsets (as shown for example in FIG. 26) in determining the correct modulation state is to use linear combinations of the correlator outputs I and J (I+J, I−J) as shown, for example, in FIGS. 8 and 9, FIGS. 12 and 13, and FIGS. 16 and 17. By applying and adjusting (through estimation or periodic adaptive compensation) coefficients a and b to the linear combinations (a)I+(b)J, (a)I−(b)J, improved separation between the modulation states can be achieved by rotating and shifting the correlator responses to eliminate angular and DC offsets.

Another method of compensating for angular and DC offsets is to use a compensation algorithm that determines an average angle between axis line F and I (FIG. 26) by mapping arctan (J/I) for a number of pulses against a look-up table, then using the average angle and sign (−, −), (−, +), (+, −), or (+, +) of the correlator outputs for received pulses. By splitting the average angle and by knowing the quadrant, the modulation state can be determined. This same angular offset data can be used to generate an error signal for assisting the receiver in tracking and locking on the received pulses.

Lock Loop Methods for Use With Vector Modulation

As with all communication receivers, the receiver 30 must be able to acquire and maintain lock on the signal transmitted by the transmitter 10. This is accomplished by synchronizing time base 12 in transmitter 10 with time base 48 in receiver 30. One embodiment for accomplishing the synchronization includes a signal combiner 50 and a thresholding circuit (not shown). The thresholding circuit calculates a sum of the absolute value of the outputs of the I and J correlators, 36 and 38, and, using a comparator (not shown) compares the summed value to a predetermined threshold value. Alternatively, the square of the output of the I correlator 36 may be summed with the square of the output of the J correlator 38 to generate a summed value for comparison to a predetermined threshold value. In either case, if the summed value is greater than the predetermined threshold value, a signal is generated that engages signal combiner 50 (FIG. 23a).

Figure 23C:
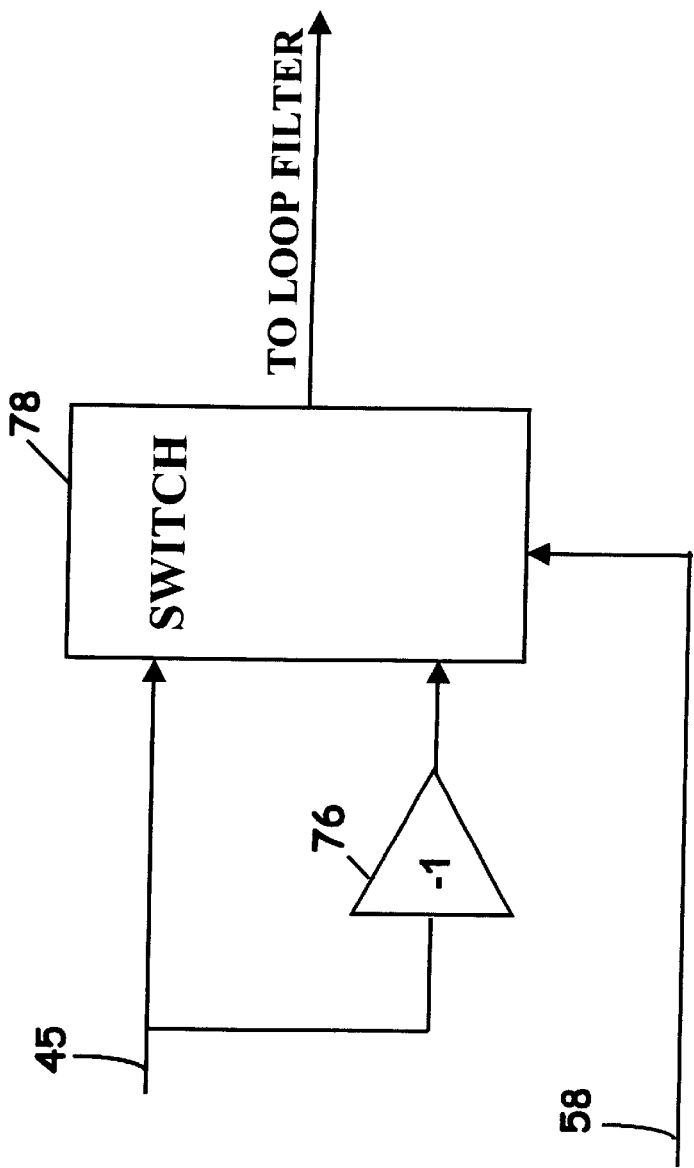
FIG. 23c is a block diagram of a signal combiner circuit that may be used in conjunction with the system and method of this invention.
Figure 23D:
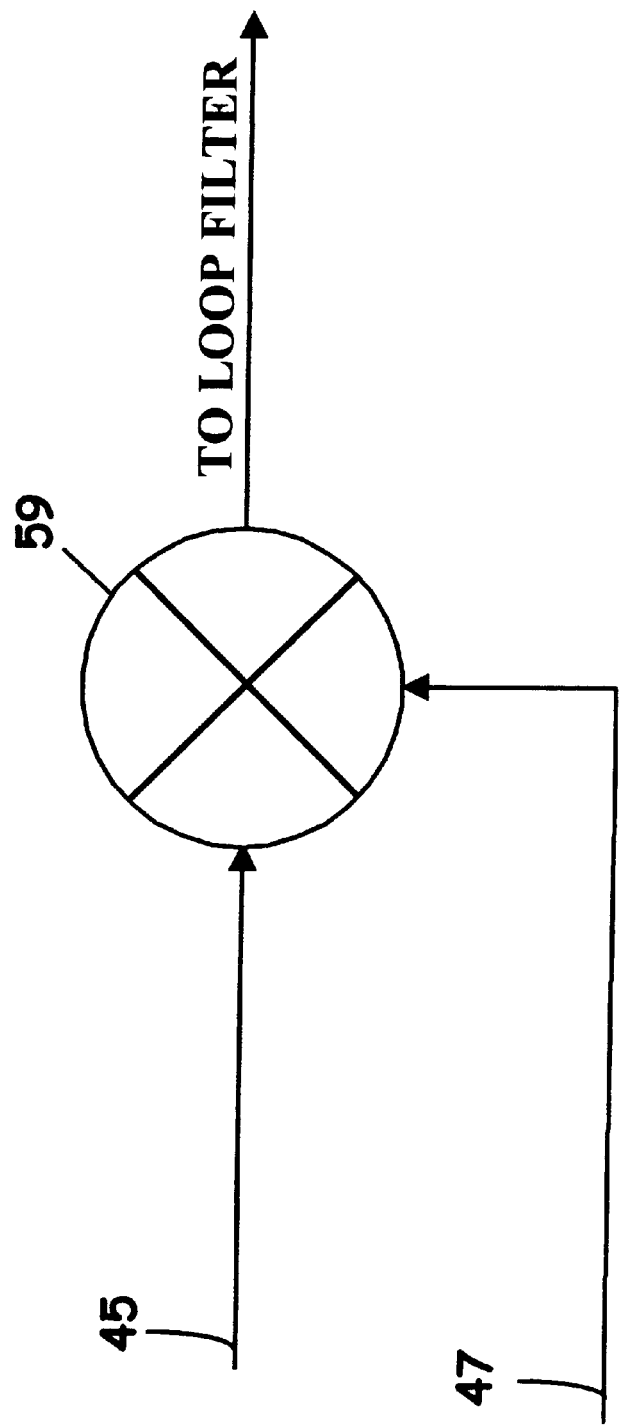
FIG. 23d is a block diagram of an alternative embodiment of the signal combiner that may be used in conjunction with the system and method of this invention.

One embodiment for signal combiner 50 (FIG. 23a or 23b) is shown in FIG. 23c. This embodiment includes an inverter 76 and a switch 78. The output of the I correlator is connected to a first input to the switch 78 and an inverted version of the output of the I correlator, generated by passing the output of the I correlator through the inverter 76, is connected to a second input to the switch 78. The output 58 of the J comparator 46 is connected to a third input to the switch 78. The output of the switch 78 is connected to the loop filter 52 (FIGS. 23a and 23b) and the output of the loop filter 52 is connected to the adjustable time base 48.

When the output of the J correlator is greater than the reference value, the J comparator 46 generates a signal that causes the switch 78 to pass the output of the I correlator through to the loop filter 52. When the output of the J correlator falls below the reference value, the J comparator 46 generates a signal that causes the switch 78 to pass the inverted version of the output of the I correlator through to the loop filter 52. The output of the loop filter 52 is used to adjust the time base 48 until the output of the J correlator rises above the reference value.

The receiver 30 may also include an automatic gain control device to ensure that the lock loop is stable. One issue associated with an impulse radio correlation receiver is that the sensitivity of the correlator derived synchronization error signal for deviations in time offset is a function of signal strength. This causes the control loop closed loop gain to vary as a function of signal strength. Since the dynamics of the control loop are a strong function of the loop gain, it is desirable to stabilize the loop gain with respect to variations in signal strength. This may be accomplished by adding an automatic gain control (AGC) loop, or by measuring the signal strength and dividing the loop gain by the measured signal strength.

A preferred location within the control loop to provide this gain stabilization is before the loop filter, especially in the case of an integrating type loop filter. This will preserve loop states in the presence of variations in signal strength. The automatic gain control device stabilizes the lock loop by adjusting the gain of the loop filter to insure that the lock loop operates in a stable manner. The automatic gain controller may be implemented using analog circuits or digital circuits. In one embodiment, the automatic gain control device includes a pair of signal strength circuits and a magnitude calculation determination circuit (See FIG. 23A). The signal strength circuits measure and feed the absolute value of the outputs of the I and J correlators to the magnitude calculation determination circuit. The magnitude calculation determination circuit compares the absolute value of the I and J correlator outputs to each other and selects the absolute value having the largest magnitude. Alternatively, the magnitude calculation determination circuit may calculate the square root of the sum of the squares of the I and J correlator outputs. In either case, the magnitude calculated by the magnitude calculation determination circuit is inverted and passed to a multiplier 40. Additional information regarding the automatic gain control device may be found in co-pending U.S. patent application Ser. No. 09/332,501, filed on Jun. 14, 1999, and entitled "System and Method for Impulse Radio Power Control. The disclosure of this patent application is hereby incorporated by reference.

Figure 29:
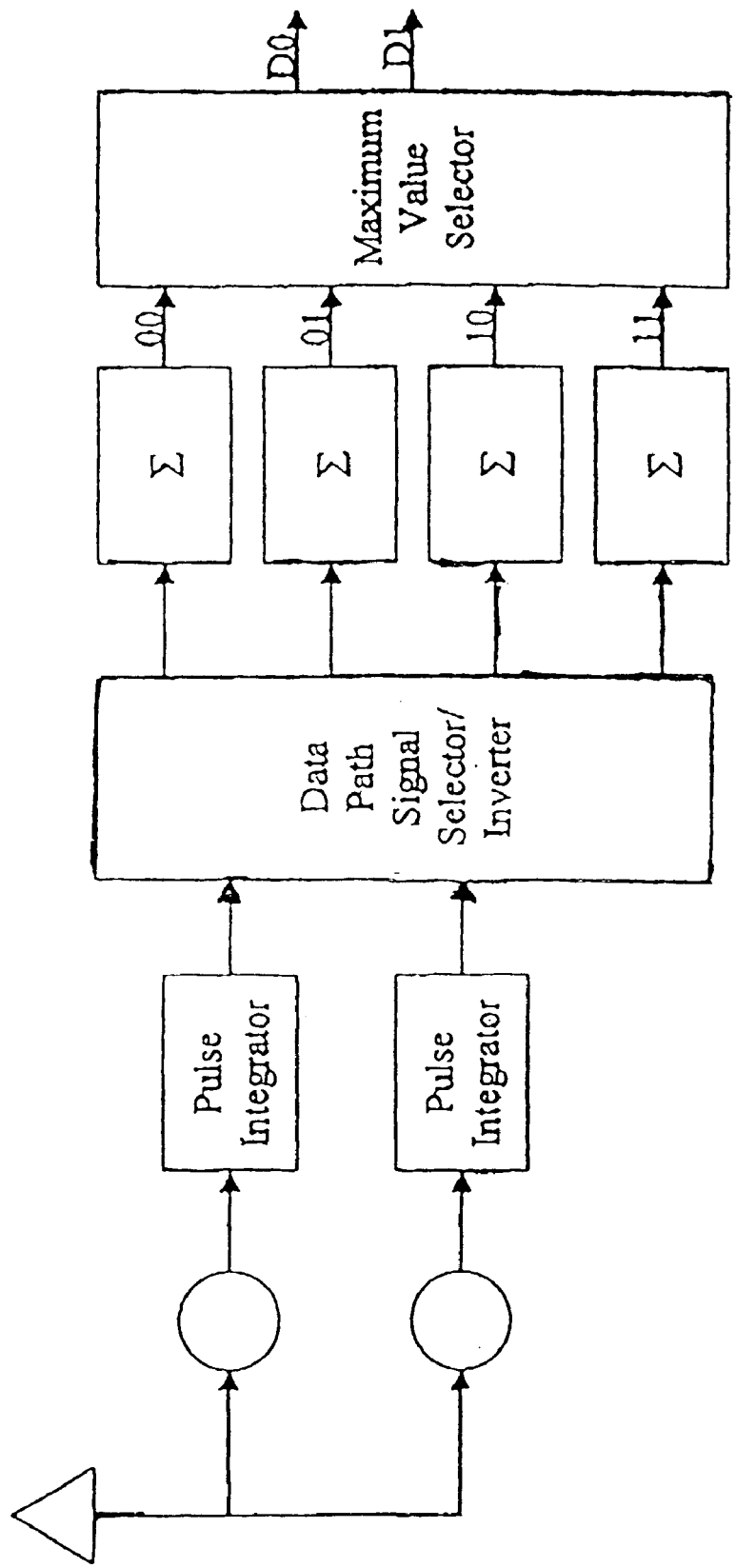
FIG. 29 is a block diagram showing the data path of another embodiment of the system of the present invention using quad flipped time modulation (QFTM).
Figure 30:
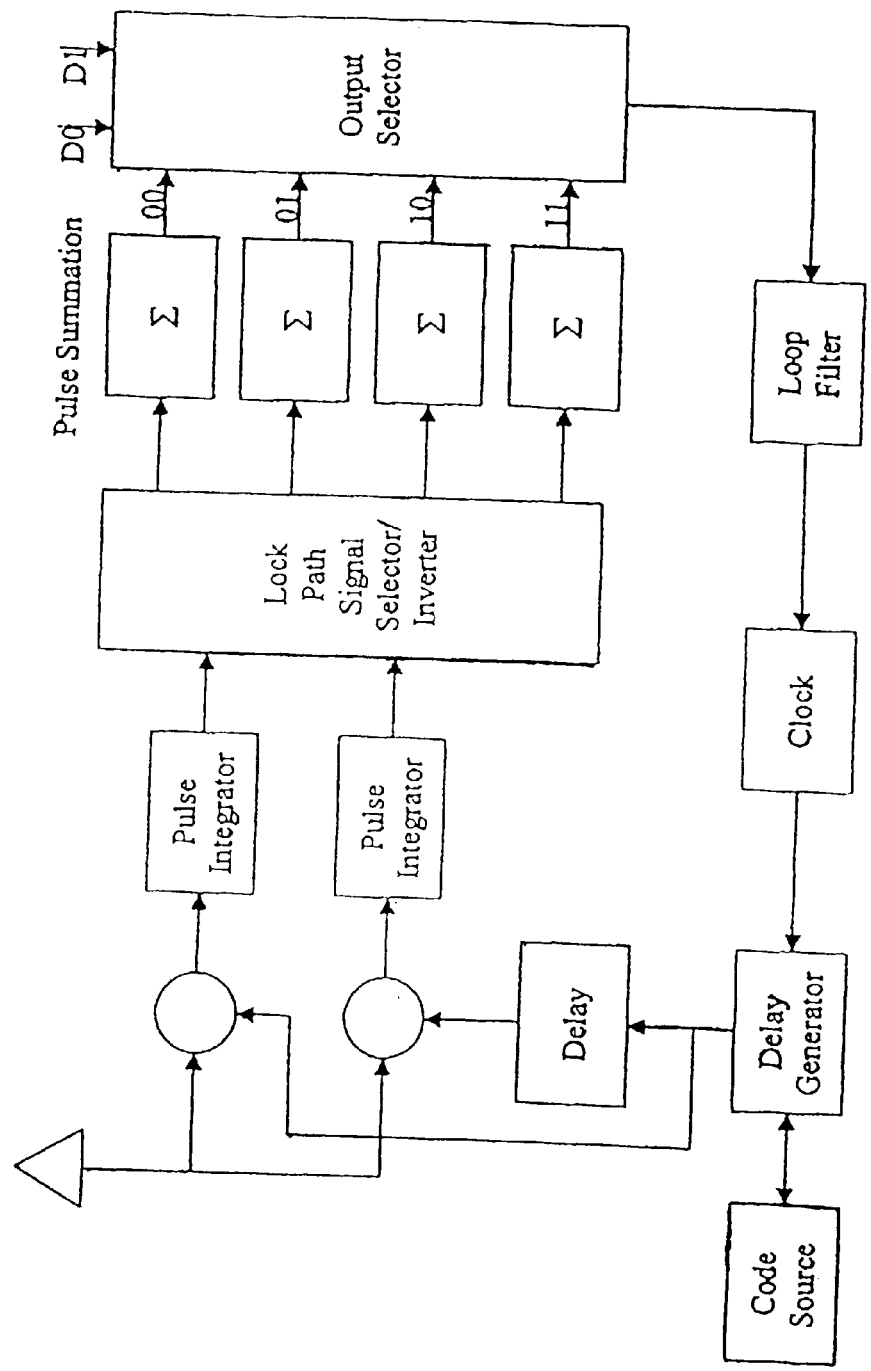
FIG. 30 is a block lock loop diagram of the QFTM system of FIG. 29.

Another embodiment for acquiring and locking to be used with vector modulation is similar to the QFTM system shown in FIGS. 29 and 30. This method is based on the observation that when the I correlator is receiving a maximum response, the J correlator is at a null. Since this situation occurs during only one of the four possible data states, it will receive only ¼ of the total signal energy under ideal balanced conditions where each of the modulation states are statistically equal in occurrence. This is normally not a problem, since the lock loop bandwidth is usually a small fraction of the data bandwidth and will therefore be much more robust than the data channel.

Additional methods for synchronizing the time bases and acquiring lock are disclosed in U.S. Pat. No. 5,832,035 (issued Nov. 3, 1998), U.S. Pat. No. 5,677,927 (issued Oct. 14, 1997), and U.S. patent application Ser. No. 09/538,292, concurrently filed with this application, entitled "System for Fast Lock and Acquisition of Ultra-Wideband Signals." The disclosures of the '035 and '927 patents, as well as U.S. patent application Ser. No. 09/538,292, are hereby incorporated in this patent specification by reference.

Data Whitening

If the data pattern is not balanced among the modulation states, this balance may be forced by whitening the data or adding redundancy. Whitening is a process whereby the data is exclusive or-ed with a predetermined pseudo-random sequence to ensure that a long run of ones or zeroes is broken up. The whitening is vulnerable to data having, by chance, the complementary pattern to the sequence and thereby creating a long string of ones or zeroes, but the chance of this is far less than a string of zeroes in the original data, and the probability of such complementary pattern can be made arbitrarily small by lengthening the pseudo-random sequence.

Alternatively, redundancy may be added to prevent a long string of ones and zeroes. Redundancy in the form of forward error correction works well. Redundancy specifically for guaranteeing lock loop states may be added.

One should be careful when designing whitening sequences or redundancy to consider that this is not a binary (two state) problem, but a four or more state problem with respect to data; whereas the lock loop may involve only a subset of these states and may have balancing requirements among this subset. For example, an all zero sequence may be balanced in a binary sense with a 10,10,10,10, exclusive-or sequence, but this sequence will only activate one of the four positions (10).

To avoid this situation, a cyclic sequence that rotates through all positions may be used. One such sequence is 00,10,11,01.

Gray Code Bit Assignment

An additional improvement in the modulation method is to map the data according to a gray binary code rather than a natural binary code. To explain this method, it is important to distinguish between a bin (quadrant) decision error and any bit error resulting therefrom. A bin decision error results from a condition where a noise voltage overcomes the signal voltage, placing the measured voltage in a different decision bin (quadrant) than the original modulation. The resulting data error is not necessarily 100% wrong. In fact quite a few of the bits (typically approaching 50%) may be the same. According to this method, points M1–M4 of FIG. 9 would be assigned 00, 01, 11, 10 respectively rather than 00, 01, 01, 11. It can be observed that using the gray code, diagonal points are inverses of one another, that is, both bits are flipped, whereas adjacent points going around the pattern have only one bit difference. Since the distances between the adjacent points are shorter than between the diagonal points, adjacent errors are more likely than diagonal errors (because a lower noise voltage is required to produce an error). This bit assignment thus reduces the bit errors resulting from bin decision errors by assigning minimum bit error patterns to shorter distances and larger bit error patterns to larger distances. This concept can be extended to more than four bits by assigning sequential modulation points along the correlation trajectory in a gray code pattern. Accordingly, adjacent points will be only one bit difference and incrementally larger distance differences will have more bit differences.

Adaptive Correction

Figure 27A:
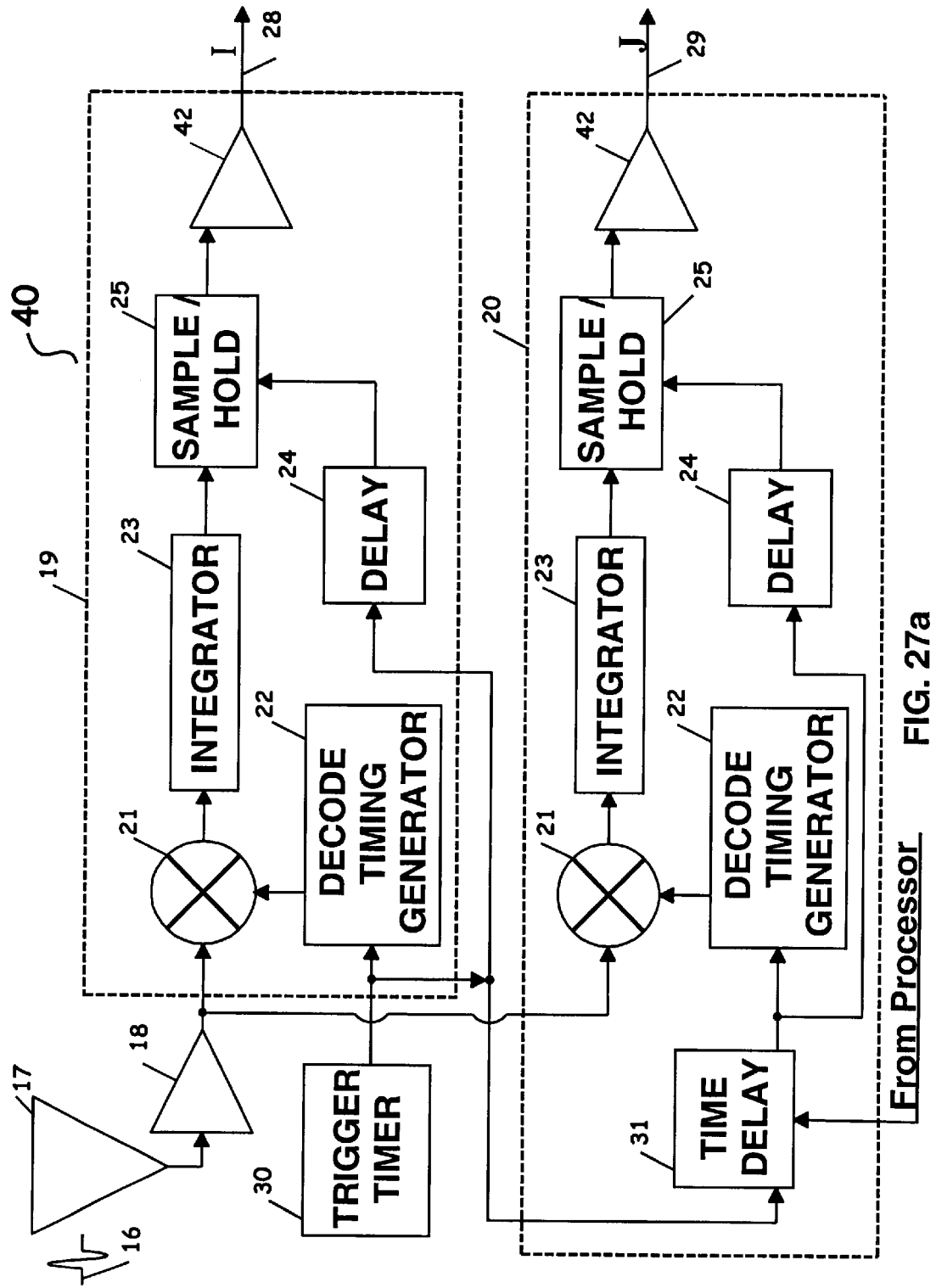
FIGS. 27a and 27b are block diagrams of a third embodiment of a wideband impulse radio receiver used in the communications system of the present invention.
Figure 27B:
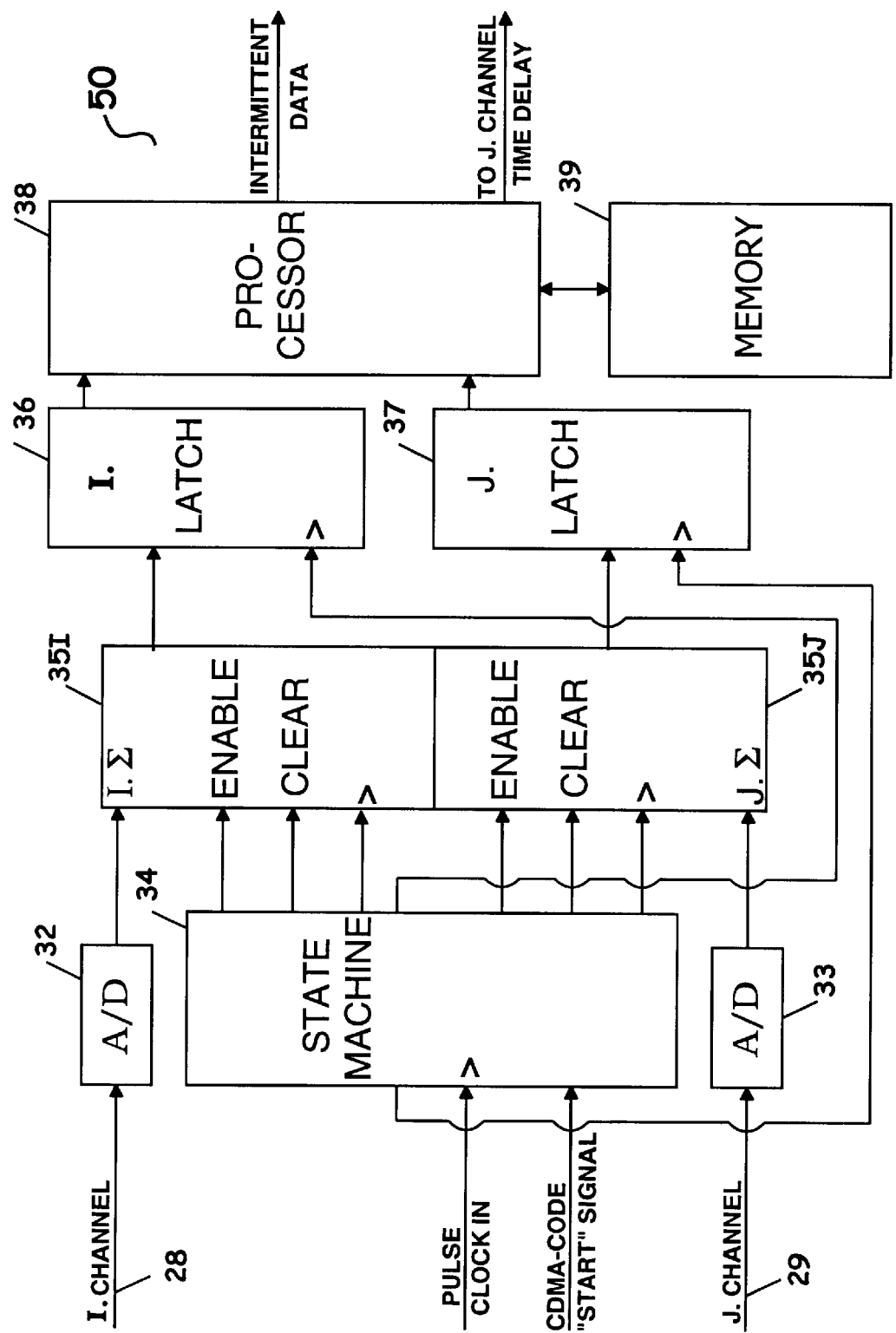

In another embodiment of the receiver, as shown on FIGS. 27a and 27b, the receiver has a first section 80 (FIG. 27a) and a digital processor section 82 (FIG. 27b). Looking first at FIG. 27a, the outputs of track and hold circuits 64 are coupled to amplifiers 84, and then to corresponding I channel and J channel A/D converters 86 (FIG. 27b). Using this embodiment, the transmitter 10 will have four positions (in time) for modulation based on the information component, thus defining four modulation states or quadrants and two bits: (0,0), (0,1), (1,0), and (1,1). Thus one symbol is two bits. The code sequence for the channel is 128 bits long, and is divided into four 32-pulse pieces, where each piece represents one symbol. After sending the complete 128-bit cannel code sequence, the transmitter repeats. Therefore, the four unique symbols are sent and continuously repeated. At the receiver, the "I" correlator 36 fires decode template signal using the same code channel information while the "J" correlator 38 is delayed from the "I" correlator timing by a time offset approximately equal to the time shift that the transmitter 10 uses for its adjacent-symbol time shift.

As with the receiver 30 of FIG. 23, the multipliers 40 and integrators 44 operate at the pulse level—they function and dump, ready to go again quickly for the next pulse. The voltages at each correlator output 88 and 90 are digitized after the value of the track and hold circuits 64 settle, and are passed for processing to a processor section that includes a state machine 92, accumulators 94I and 94J, and latches 96 and 98. These digital components can be integrated in to single device, such as a field programmable gate array (FPGA). A code "start" signal is a synchronizing signal from the time base 48 which, in this embodiment, means that the 128-bit channel code sequence is starting at the receiver.

At the start of the 128-pulse code sequence, the state machine 92 resets the accumulators 94I and 94J. It then enables accumulation (integration) for $I_1$ and $J_1$ for the first 32 pulses ($1^{st}$ quadrant, $1^{st}$ symbol), then latches the results in latch 96. Integration stops on ($I_1$, $J_1$), then is enabled on ($I_2$, $J_2$) for the next 32 pulses and latched. The same process is repeated for ($I_3$, $J_3$) and ($I_4$, $J_4$), representing 32-pulse integration for modulation quadrants three and four, respectively. A vector demodulation algorithm in processor 100 plots the signed "I" values along a virtual X-axis, and the signed "J" values along a virtual Y-axis, compares this information to I and J value tables stored in memory 102, and estimates the value of the two data bits corresponding to each modulation state.

In one embodiment, a delay period of 130 ps is used for establishing separation between adjacent modulation states in the transmitter 10. A delay of 130 ps is also used between the receiver's "I" and "J" correlator (36, 38) triggers (the delay imposed by time delay circuit 54).

Figure 28:
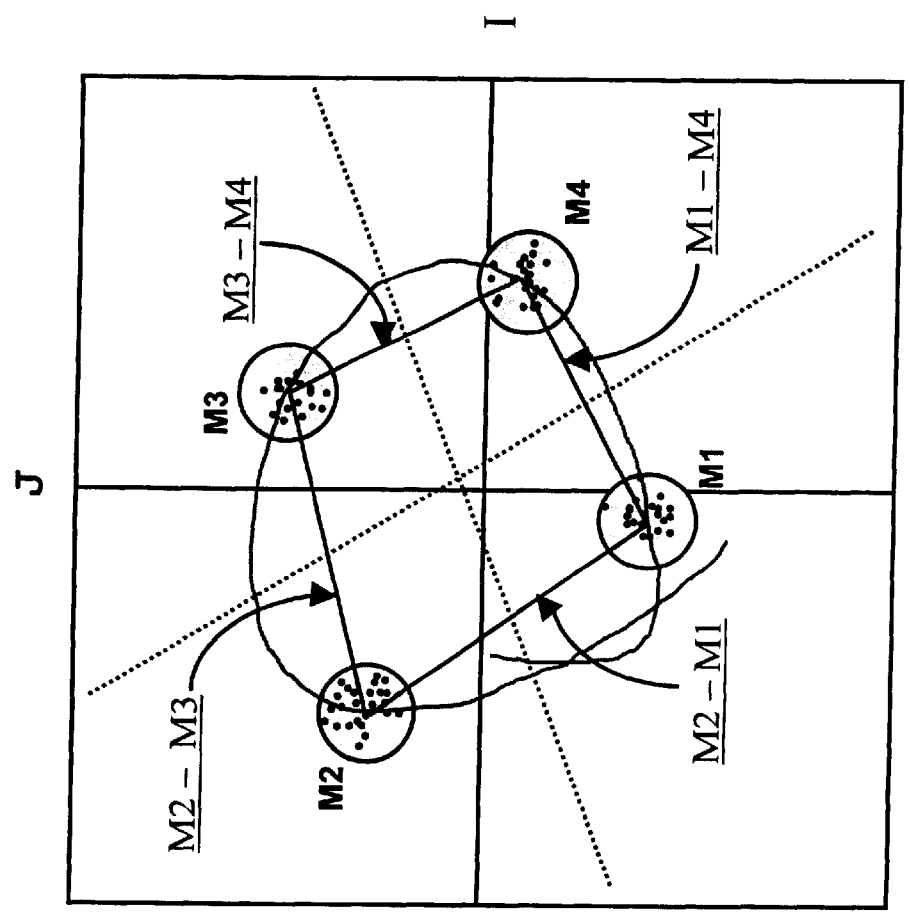
FIG. 28 is a plot of the I and J channel scatter from the wideband impulse radio receiver of FIGS. 27a and 27b.

By use of a phase-locked 1.28 GHz oscillator at the receiver, the receiver is able to slide its correlator triggers in $100 \times 10^{-9}/32768$ seconds per step (or ≈3.052 ps/step) to achieve code phase alignment with the transmitter, as well as to optimally position the "I" channel 36 of into the first modulation state. A plot of the scatter points associated with the four modulation states is shown in FIG. 28. The processor 100 can separately monitor the average values of the I and J channel outputs to determine if a DC offset exists that needs correction. Alternatively, or in addition, the processor 100 can store a sequence of scatter points generated at the I and J channel outputs 88 and 90 and periodically compare them to an idealized plot of the expected scatter points in each modulation state or quadrant, as stored in memory 102. In either case, the processor 100 can compensate for error by providing a signal to the J channel timing delay circuit 54 that will vary the amount of delay between triggering of the I and J channel correlators, until separation between the four modulation states is optimized. Optionally, the adjustment of the delay period can be communicated to the transmitter as well.

In a preferred embodiment, the processor 100 insures that all of the modulation states are equally spaced from each other. To accomplish this, the processor 100 first calculates an average value for each modulation state. Next, the processor 100 calculates the distance between each state. The processor 100 then identifies the minimum distance between any two modulation states and generates an error signal that is used to adjust the time delay circuit 54, which controls the relative delay between correlators, 36 and 38. Specifically, the processor 100 adjusts the delay between correlators so that the minimum distance separating any two modulation states is maximized. In an ideal situation, this adjustment process will cause the modulation states to be equally spaced. The delay necessary to maximize the separation may vary according to the propagation path.

For example, FIG. 28 shows a scatter plot of modulation states M1, M2, M3, and M4, the modulation states being unequally spaced from each other. First, the processor 100 calculates the average value for each modulation state, $M1_{avg}$, $M2_{avg}$, $M3_{avg}$, and $M4_{avg}$. Second, the processor 100 calculates the distances $M1_{avg}-M2_{avg}$, $M2_{avg}-M3_{avg}$, $M3_{avg}-M4_{avg}$, and $M4_{avg}-M1_{avg}$ using the averages values of each modulation state. The processor 100 then identifies the two modulation states separated by the shortest distance and generates an error signal that is used to adjust the time delay circuit 54 until the distance is increased as much as possible.

Quadrature Flip Time Modulation

Figure 36:
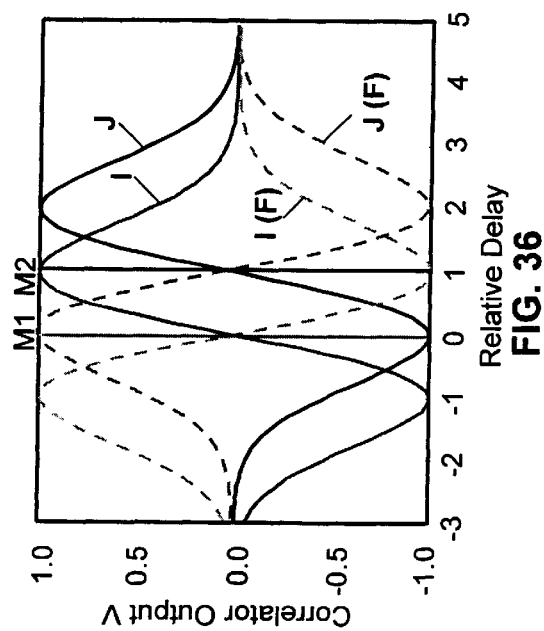
FIG. 36 is a plot of the correlator outputs, I and J, from FIG. 6 and an inverter version of the correlator outputs, I and J.
Figure 37:
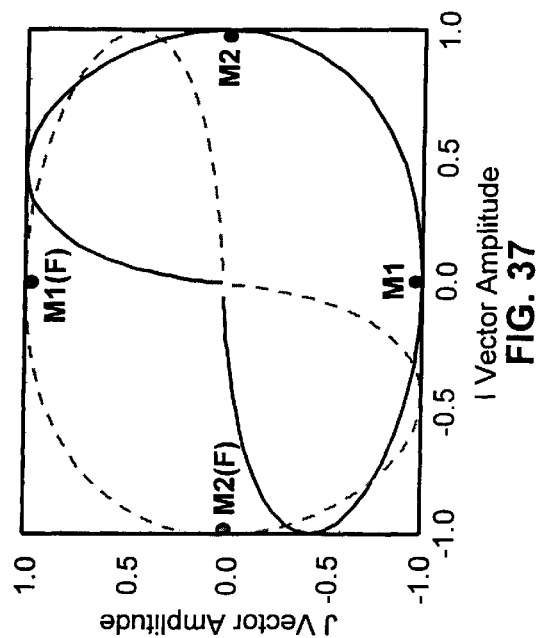
FIG. 37 is a polar plot of four possible modulation states of the I and J channels generated in accordance with the correlator outputs shown in FIG. 36.
Figure 38:
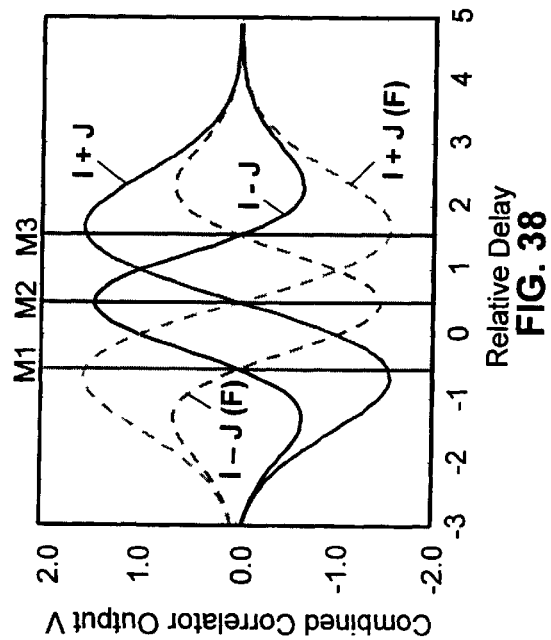
FIG. 38 is a plot of a linear combination (I+J and I−J) of the I and J correlator outputs shown in FIG. 36 and an inverted version of the linear combination (I+J and I−J).
Figure 39:
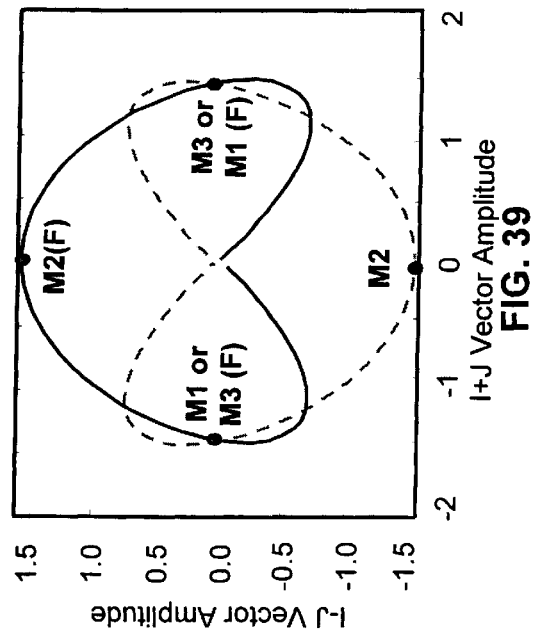
FIG. 39 is a polar plot of four possible modulation states of the I and J channels generated in accordance with the correlator outputs shown in FIG. 38.

In another embodiment of the invention, additional modulation states can be imposed on transmitted pulses using quadrature flip time modulation (QFTM) wherein a transmitted pulse is delayed and/or inverted in order to impose one or more modulation state, as shown in FIGS. 29 and 30. Thus, a first modulation state (representing 0,0) can be defined by pulse that is not delayed and not inverted. A second modulation state (0,1) can be defined by a pulse that is delayed but not inverted, and so on. To illustrate this concept, consider FIG. 36 and FIG. 37. FIG. 36 is a plot of the I and J correlator outputs, I and J, and an inverted version of the I and J correlator outputs, I (F) and J(F). FIG. 37 is a polar plot generated by using the correlator outputs shown in FIG. 36. By using the inverted version of the I and J correlator outputs, additional modulation states may be generated (see M1(F) and M2(F)). A similar illustration of this concept is shown in FIGS. 38 and 39. Further information regarding QFTM is disclosed in U.S. patent application Ser. No. 09/537,692, concurrently filed, entitled "Apparatus, System and Method for Flip Modulation in an Impulse Radio Communications System," which is incorporated herein by reference.

Although embodiments of the invention have been described with respect to four modulation states and specific time delay periods, the system and method of the present invention can be used with more than four modulation states (see FIGS. 9, 13, and 21) and/or other delay periods, without departing from the scope of the invention. Further, because a portion of the correlator output reflects a linear transfer function, i.e., the correlator functions as a time to voltage converter, other conventional forms of modulation can be applied to the transmitted signal.

Finally, multiple correlators may be used in the receiver to provide rake acquisition of pulses and additional modulation schemes. By using these additional modulation schemes, increased information about a received pulse can be ascertained, as well as, increased data transfer rates. Further information regarding the use of multiple correlators in a receiver is disclosed in U.S. patent application Ser. No. 09/537,264, concurrently filed with this application, entitled "System and Method of Using Multiple Correlator Receivers in an Impulse Radio System," which is hereby incorporated into this application by reference.

Thus, although there have been described particular embodiments of the present invention of a new and useful Vector Modulation System and Method for Wideband Impulse Radio Communications, it is not intended that such references be construed as limitations upon the scope of this invention except as set forth in the following claims. Also, although certain embodiments of the invention have been described in combination with specified functional and operational parameters, these parameters are provided for illustrative purposes only and are not deemed limitations on the scope of the invention.

What is claimed is:

1. A method of communicating information in an RF signal emitted by an ultra wideband impulse radio transmitter comprising the steps of:

a. separating the information into an information component signal containing data bits;

b. generating in the transmitter a sequence of ultra wideband RF pulses, each RF pulse characterized by a waveform defining a wave shape and a pulse cycle;

c. modulating a time position of the RF pulses in response to a channelization component signal and in response to the value of the data bits in the information component signal, wherein the time position of each modulated RF pulse can define one of at least two separated modulation states such that each pulse can communicate at least two of the data bits, and wherein the step of modulating the time position of the RF pulses in response to the information component signal includes varying the time positions of the pulses at time delay offset points along a total modulation of greater than one-quarter of the pulse cycle; and d. transmitting the modulated RF pulses to an ultra wideband impulse radio receiver; and e. demodulating the modulated RF pulses in the receiver to extract the information from the data bits communicated by each pulse.

2. A method of communicating information in an RF signal emitted by an ultra wideband impulse radio transmitter comprising the steps of:

a. separating the information into an information component signal containing data bits;

b. generating in the transmitter a sequence of ultra wideband RF pulses, each RF pulse characterized by a waveform defining a wave shape and a pulse cycle;

c. modulating a time position of the RF pulses in response to a channelization component signal and in response to the value of the data bits in the information component signal, wherein the time position of each modulated RF pulse can define one of at least two separated modulation states such that each pulse can communicate at least two of the data bits, and wherein the step of modulating the time position of the RF pulses in response to the information component signal includes varying the time positions of the pulses at time delay offset points along a total modulation of greater than one-quarter of the pulse cycle;

d. adjusting the positions of the time delay offset points along the pulse cycle to maximum separation between the modulation states;

e. transmitting the modulated RF pulses to an ultra wideband impulse radio receiver; and f. demodulating the modulated RF pulses in the receiver to extract the information from the data bits communicated by each pulse.

3. The method of claim 2 wherein the step of adjusting the positions of the time delay offset points includes varying the positions of the offset points in response to changes in the wave shape of the transmitted RF pulses.

4. A method of communicating information in an RF signal emitted by an ultra wideband impulse radio transmitter comprising the steps of:

a. separating the information into an information component signal containing data bits;

b. generating in the transmitter a sequence of ultra wideband RF pulses, each RF pulse characterized by a waveform defining a wave shape and a pulse cycle;

c. modulating a time position of the RF pulses in response to a channelization component signal and in response to the value of the data bits in the information component signal, wherein the time position of each modulated RF pulse can define one of at least two separated modulation states such that each pulse can communicate at least two of the data bits, wherein the step of modulating the time position of the RF pulses in response to the information component signal includes varying the time positions of the pulses at time delay offset points along a total modulation of greater than one-quarter of the pulse cycle, and wherein each RF pulse is modulated by the information component signal to one of four modulation states, each modulation state corresponding to one of four time delay offset points nominally separated in time by approximately one-quarter cycle intervals along the pulse cycle;

d. transmitting the modulated RF pulses to an ultra wideband impulse radio receiver; and e. demodulating the modulated RF pulses in the receiver to extract the information from the data bits communicated by each pulse.

5. The method of claim 4 wherein the demodulation step includes separating the time position of each transmitted RF pulse into a reference channel and an offset channel, the reference channel based on a first timing signal synchronized with the channelization component signal and the offset channel based on a second timing signal that is delayed from the first timing signal by a known offset period.

6. The method of claim 5 wherein the known offset period corresponds to the time separation between the time delay offset points in the transmitted RF pulses.

7. A wideband impulse radio communications system comprising:

a. an impulse radio transmitter having an information component modulator, the information component modulator electrically connected to an output stage and operative to modulate a time position of each of a series of wideband RF pulses generated by the output stage;

b. the information component modulator operative to modulate the time position of each RF pulse into one of at least four separate modulation states, whereby each RF pulse can communicate at least two bits of data;

c. an impulse radio receiver comprising a first correlator responsive to a first timing signal and at least one delayed correlator, the delayed correlator responsive to a second timing signal that is delayed from the first timing signal by an offset period; and d. the first correlator and delayed correlator having separate outputs that generate signals that, when examined with respect to a single pulse, indicate the modulation state and data associated with that pulse by the transmitter.

8. The system of claim 7 wherein the receiver further comprises an adjustable time delay circuit coupled to the first timing signal and is operative to generate the second timing signal, and wherein the system further comprises means to vary the offset period to improve separation between the modulation states.

9. The system of claim 7 wherein the first and delayed correlators each include an integrator and a comparator, each comparator having a first input coupled to an integrator output and a voltage reference input.

10. The system of claim 9 wherein the first and delayed correlators further comprise a sample and hold circuit connected between the integrator and the comparator, and a signal averager having an input coupled to the output of sample and hold circuit and an output coupled to the comparator voltage reference input.

11. The system of claim 10 wherein the receiver further comprises an adjustable time delay circuit coupled to the first timing signal and operative to generate the second timing signal, and wherein the system further comprises means to vary the offset period to improve separation between the modulation states.

12. A vector modulation apparatus, comprising:

an impulse radio transmitter comprising a transmitter time base for providing a transmitter periodic timing signal;

a time delay modulator connected to the transmitter time base and an information source, the time delay modulator responsive to the information source and operable to delay the timing signal by one of four predetermined time delay periods in order to generate a time delay modulator signal, and wherein the time delay periods represent two bits of data;

a code time modulator connected to the time delay modulator and a PN code source, the code time modulator operable to delay the time delay modulator signal in accordance with a predetermined PN code stored in the PN code source to generate a code time modulator signal;

a transmitter output stage connected to the code time modulator and operable to generate wideband RF pulses in response to the code time modulator signal received from the code time modulator; and a transmitter antenna for emitting the wideband RF pulses;

an impulse radio receiver comprising a receiver antenna for receiving the wideband RF pulses;

a receiver time base for generating a receiver periodic timing signal;

a synchronizing means for synchronizing the receiver time base with the transmitter time base;

a first correlator for generating a reference output signal, the first correlator including a first multiplier and a first decode timing generator, the first decode timing generator in communication with the receiver time base and operable to generate a sequence of narrow timing pulses corresponding to the predetermined PN code;

a delayed correlator for generating a delayed offset output signal, the delayed offset output signal delayed in time with respect to the reference output signal, the delayed correlator including a second multiplier, a time delay circuit, and a second decode timing generator, the time delay circuit in communication with the receiver time base and the second decode timing generator, and the second timing generator operable to generate a delayed sequence of narrow timing pulses corresponding to the predetermined PN code; and whereby the reference output signal and the delayed offset output signal corresponding to a single pulse are representative of the two bits of data associated with that pulse.

13. The apparatus of claim 12, wherein the time delay circuit comprises an adjustable time delay circuit and the impulse radio receiver further comprises a means for varying the adjustable time delay circuit to increase the time delay between the reference output signal and the delayed offset output signal.

14. The apparatus of claim 12, wherein the first correlator and the delayed correlator each include an integrator and a comparator, each comparator having a first input coupled to an integrator output and a voltage reference input.

15. The apparatus of claim 14, wherein each of the first and delayed correlators further comprise a sample and hold circuit connected between the integrator and the comparator, and a signal averager having an input coupled to the output of the sample and hold circuit and an output coupled to the comparator voltage reference input.

16. The apparatus of claim 15, wherein the time delay circuit comprises an adjustable time delay circuit and the impulse radio receiver further comprises a means for varying the adjustable time delay circuit to adjust the time delay between the reference output signal and the delayed offset output signal.

17. A vector modulation transmitter, comprising:

a transmitter time base for providing a transmitter periodic timing signal;

a time delay modulator connected to the transmitter time base and an information source, the time delay modulator responsive to the information source and operable to delay the timing signal by one of four predetermined time delay periods in order to generate a time delay modulator signal, and wherein the time delay periods represent at least two bits of data;

a code time modulator connected to the time delay modulator and a PN code source, the code time modulator operable to delay the time delay modulator signal in accordance with a predetermined PN code stored in the PN code source to generate a code time modulator signal;

a transmitter output stage connected to the code time modulator and operable to generate wideband RF pulses in response to the code time modulator signal received from the code time modulator; and a transmitter antenna for emitting the wideband RF pulses.

18. A vector modulator receiver, comprising:

a receiver antenna for receiving wideband RF pulses;

a receiver time base for generating a receiver periodic timing signal;

a synchronizing means for synchronizing the receiver time base with a transmitter time base associated with the receiver;

a first correlator for generating a reference output signal, the first correlator including a first multiplier and a first decode timing generator, the first decode timing generator in communication with the receiver time base and operable to generate a sequence of narrow timing pulses corresponding to a predetermined PN code;

a delayed correlator for generating a delayed offset output signal, the delayed offset output signal delayed in time with respect to the reference output signal, the delayed correlator including a second multiplier, a time delay circuit, and a second decode timing generator, the time delay circuit in communication with the receiver time base and the second decode timing generator, and the second timing generator operable to generate a delayed sequence of narrow timing pulses corresponding to the predetermined PN code; and whereby the reference output signal and the delayed offset output signal corresponding to a single pulse are representative of at least two bits of data associated with the single pulse by a corresponding transmitter.

19. A method of transmitting vector modulated ultra-wide band pulses, comprising the steps of:

generating a periodic timing signal using a transmitter time base;

generating a time delay modulator signal by delaying the periodic timing signal by one of four predetermined time delay periods, each time delay period representative of at least two bits of data and each time delay period having an associated modulation state;

adjusting the predetermined time delay periods to maximize separation between the modulation states associated with the predetermined time period periods;

generating a code time modulator signal by delaying the time delay modulator signal in accordance with a predetermined code stored in a code source;

generating wide band RF pulses in response to the code time modulator signal using a transmitter output stage; and transmitting the wide band RF pulses using a transmitter antenna.

20. A method of receiving vector modulated ultra wide band pulses, comprising the steps of:

receiving the wide band pulses using a receiver antenna, each wide band pulse representative of at least two bits of data;

generating a periodic timing signal using a receiver time base;

synchronizing the receiver time base with an associated transmitter time base;

generating a sequence of narrow timing pulses corresponding to a predetermined PN code using the periodic timing signal;

generating a reference output signal by multiplying the received wide band pulses by the sequence of narrow timing pulses using a first correlator; and generating a delayed offset output signal by multiplying the received wide band pulses by a delayed version of the sequence of narrow timing pulses using a delayed correlator.

21. A vector modulation transmitter, comprising:

means for generating a periodic timing signal;

means for generating a time delay modulator signal by delaying the periodic timing signal by one of four predetermined time delay periods, each time delay period representative of at least two bits of data and approximately one-quarter of a total time delay formed by the four predetermined time delay periods;

means for generating a code time modulator signal by delaying the time delay modulator signal in accordance with a predetermined PN code;

means for generating wide band RF pulses in response to the code time modulator signal; and means for transmitting the wide band RF pulses.

22. A vector modulation receiver, comprising:

means for receiving the wide band pulses, each wide band pulse representative of at least two bits of data;

means for generating a receiver periodic timing signal;

means for synchronizing the receiver periodic timing signal with an associated transmitter periodic timing signal;

means for generating a sequence of narrow timing pulses corresponding to a predetermined PN code using the receiver periodic timing signal;

means for generating a reference output signal by multiplying the received wide band pulses by the sequence of narrow timing pulses; and means for generating a delayed offset output signal by multiplying the received wide band pulses by a delayed version of the sequence of narrow timing pulses.

* * * * *